(12) United States Patent
Zhang et al.

(10) Patent No.: US 12,276,735 B2
(45) Date of Patent: Apr. 15, 2025

(54) ENHANCED NAVIGATION MODE WITH LOCATION DETECTION AND MAP LAYER SWITCHING

(71) Applicant: QUALCOMM Incorporated, San Diego, CA (US)

(72) Inventors: Danlu Zhang, San Diego, CA (US); Kevin Dao, San Diego, CA (US); Arnold Jason Gum, San Diego, CA (US); Bala Ramasamy, San Marcos, CA (US); Kuirong Wang, San Diego, CA (US); Damir Didjusto, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 355 days.

(21) Appl. No.: 17/817,571

(22) Filed: Aug. 4, 2022

(65) Prior Publication Data
US 2024/0045073 A1 Feb. 8, 2024

(51) Int. Cl.
*G01S 19/07* (2010.01)
*H04W 4/02* (2018.01)
*H04W 4/029* (2018.01)

(52) U.S. Cl.
CPC ............ *G01S 19/07* (2013.01); *H04W 4/025* (2013.01); *H04W 4/029* (2018.02)

(58) Field of Classification Search
CPC .......... G01S 19/07; G01S 19/14; G01S 19/40; G01S 19/47; G01S 19/45; H04W 4/025; H04W 4/029; H04W 4/027; G01C 21/20
USPC ...................................................... 455/456.1
See application file for complete search history.

(56) References Cited

U.S. PATENT DOCUMENTS

| 10,712,452 | B2 * | 7/2020 | Baudia ................... G01S 19/48 |
| 2004/0230370 | A1 | 11/2004 | Tzamaloukas | |
| 2013/0342391 | A1 * | 12/2013 | Hoang .................... G01S 5/019 |
| | | | 342/357.3 |

(Continued)

FOREIGN PATENT DOCUMENTS

| CA | 2729410 C | 3/2016 |
| KR | 20180089441 A | 8/2018 |
| WO | 2011026656 A1 | 3/2011 |

OTHER PUBLICATIONS

Partial International Search Report—PCT/US2023/028180—ISA/EPO—Dec. 14, 2023.

(Continued)

*Primary Examiner* — Don N Vo
(74) *Attorney, Agent, or Firm* — Procopio, Cory, Hargreaves & Savitch LLP

(57) ABSTRACT

Aspects presented herein may enhance the navigation function of navigation/map applications or systems when GNSS signals are weak or sporadic. In one aspect, a UE monitors a position of the UE based on GNSS communication, where the position of the UE is monitored using at least one first map layer of a plurality of map layers associated with a map. The UE detects that the position of the UE corresponds to a predefined location when the GNSS communication is below a communication threshold. The UE switches to monitoring the position of the UE using at least one second map layer of the plurality of map layers upon detecting that the position of the UE corresponds to the predefined location, where the at least one second map layer is associated with the predefined location.

30 Claims, 14 Drawing Sheets

(56) References Cited

U.S. PATENT DOCUMENTS

| | | | | |
|---|---|---|---|---|
| 2016/0061607 | A1* | 3/2016 | Yang | G01C 21/206 |
| | | | | 701/400 |
| 2017/0241787 | A1 | 8/2017 | Trigoni et al. | |
| 2018/0038962 | A1* | 2/2018 | Macgougan | G01S 19/26 |
| 2018/0255431 | A1 | 9/2018 | Robertson et al. | |
| 2021/0341940 | A1* | 11/2021 | Baik | G01C 21/3896 |
| 2022/0357463 | A1* | 11/2022 | Nurminen | G06Q 10/0833 |

OTHER PUBLICATIONS

International Search Report and Written Opinion—PCT/US2023/028180—ISA/EPO—Apr. 8, 2024

* cited by examiner

ENHANCED NAVIGATION MODE WITH LOCATION DETECTION AND MAP LAYER SWITCHING

TECHNICAL FIELD

The present disclosure relates generally to positioning systems, and more particularly, to positioning systems involving navigation.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus monitors a position of a user equipment (UE) based on Global Navigation Satellite System (GNSS) communication, where the position of the UE is monitored using at least one first map layer of a plurality of map layers associated with a map. The apparatus detects that the position of the UE corresponds to a predefined location when the GNSS communication is below a communication threshold. The apparatus switches to monitoring the position of the UE using at least one second map layer of the plurality of map layers upon detecting that the position of the UE corresponds to the predefined location, where the at least one second map layer is associated with the predefined location.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
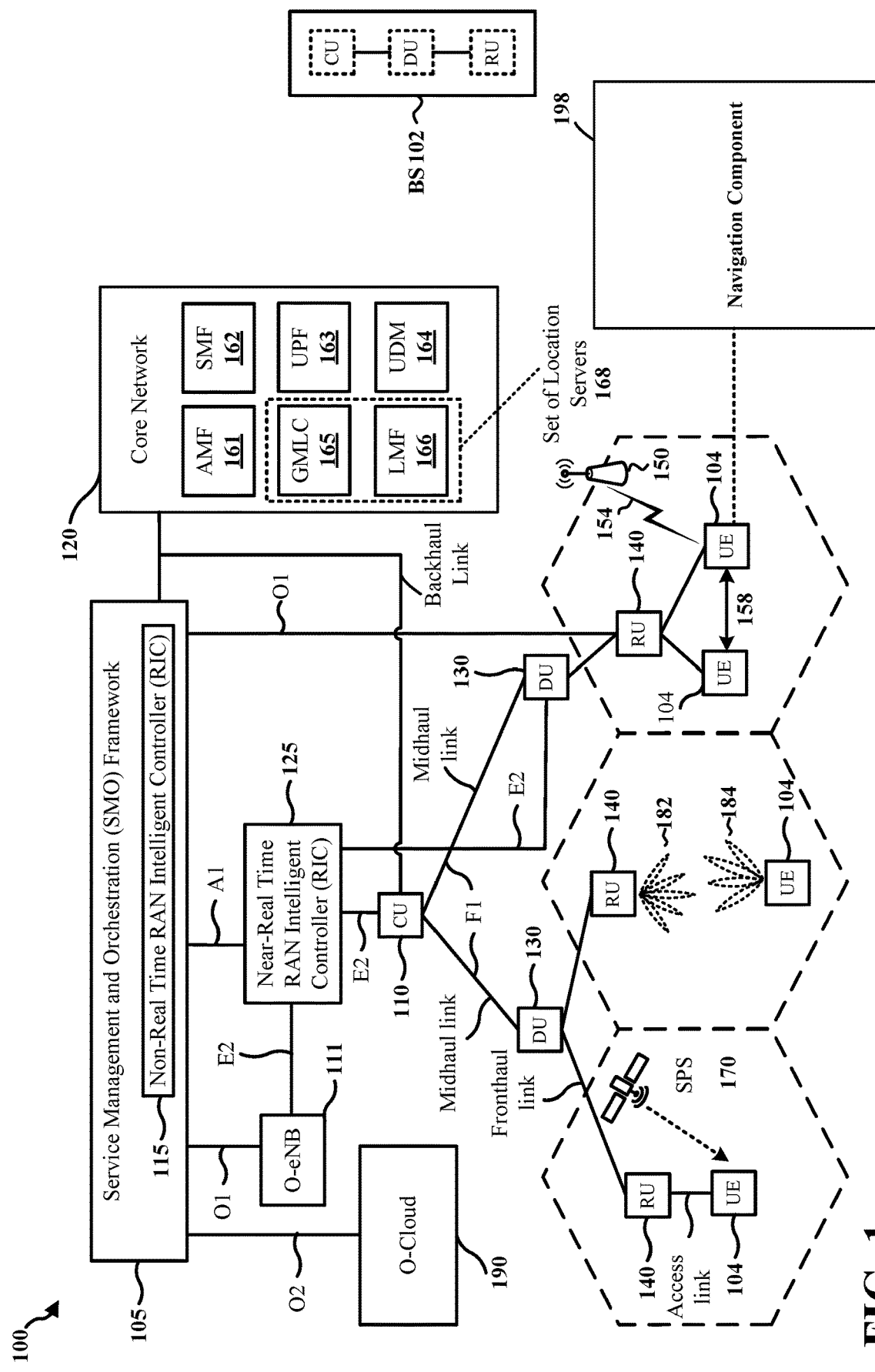
FIG. 1 is a diagram illustrating an example of a wireless communications system and an access network.

Aspects presented herein may enhance the navigation function of the navigation/map applications or systems when the GNSS signals are weak or sporadic (e.g., under an indoor or underground garage condition). Aspects presented herein may enable a navigation/map application to detect whether a user is in a predefined location when the GNSS signals become unavailable, and the navigation/map application may switch the positioning of the user using a different map layer that corresponds to the predefined location and/or navigate the user using at least one alternative positioning method that is not based on GNSS signals. For example, in one aspect of the present disclosure, a navigation system (e.g., a UE) of an automobile may be able to detect whether the automobile enters a garage (or under an in-garage condition), and the navigation system may provide or build drivable routes within the garage, such as based on crowd sourcing and/or indoor positioning.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit.

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RA configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to monitor a position of the UE based on GNSS communication, where the position of the UE is monitored using at least one first map layer of a plurality of map layers associated with a map; detect that the position of the UE corresponds to a predefined location when the GNSS communication is below a communication threshold; and switch to monitoring the position of the UE using at least one second map layer of the plurality of map layers upon detecting that the position of the UE corresponds to the predefined location, where the at least one second map layer is associated with the predefined location.

Figure 2:
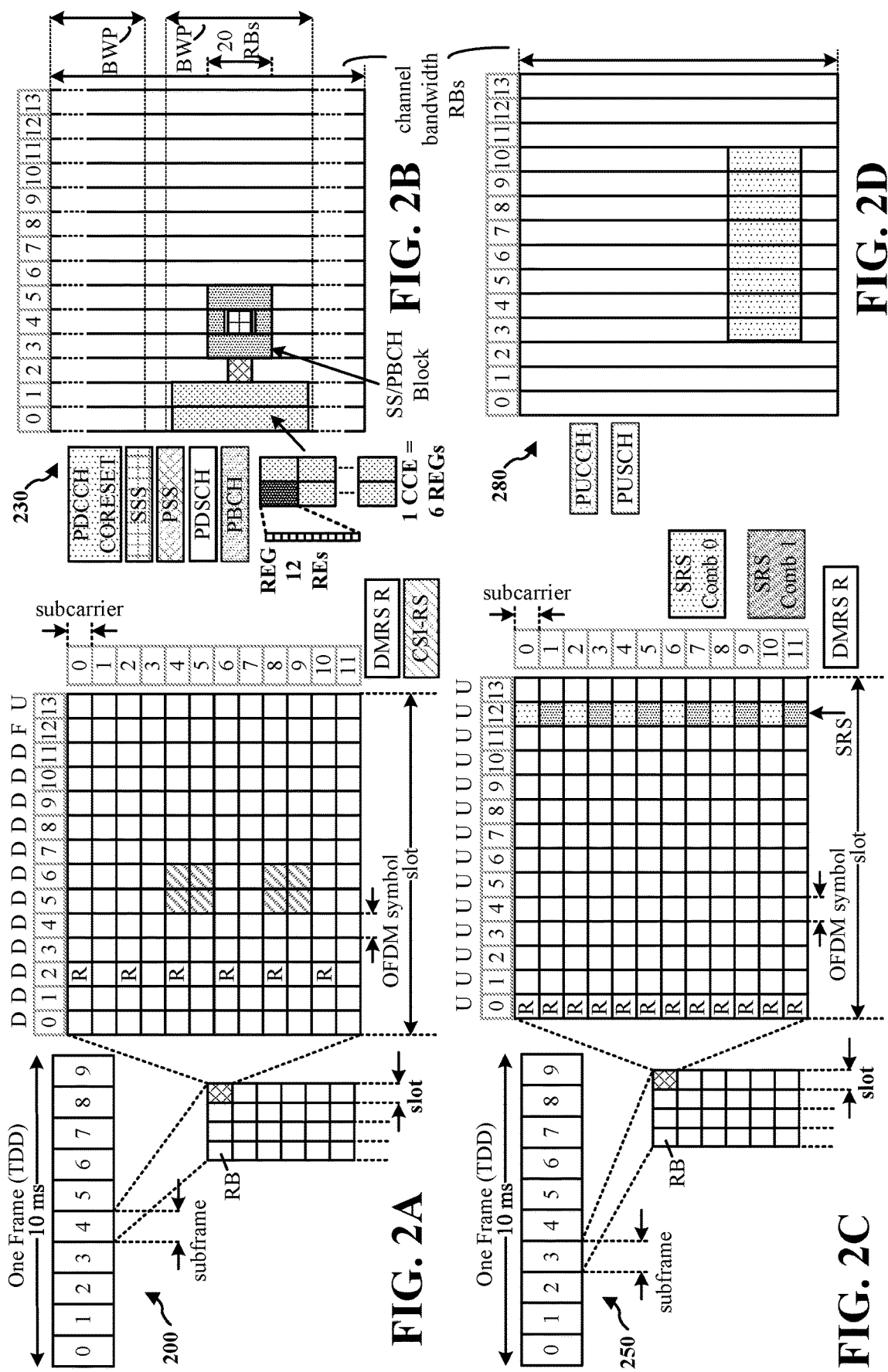
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS<br>$\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
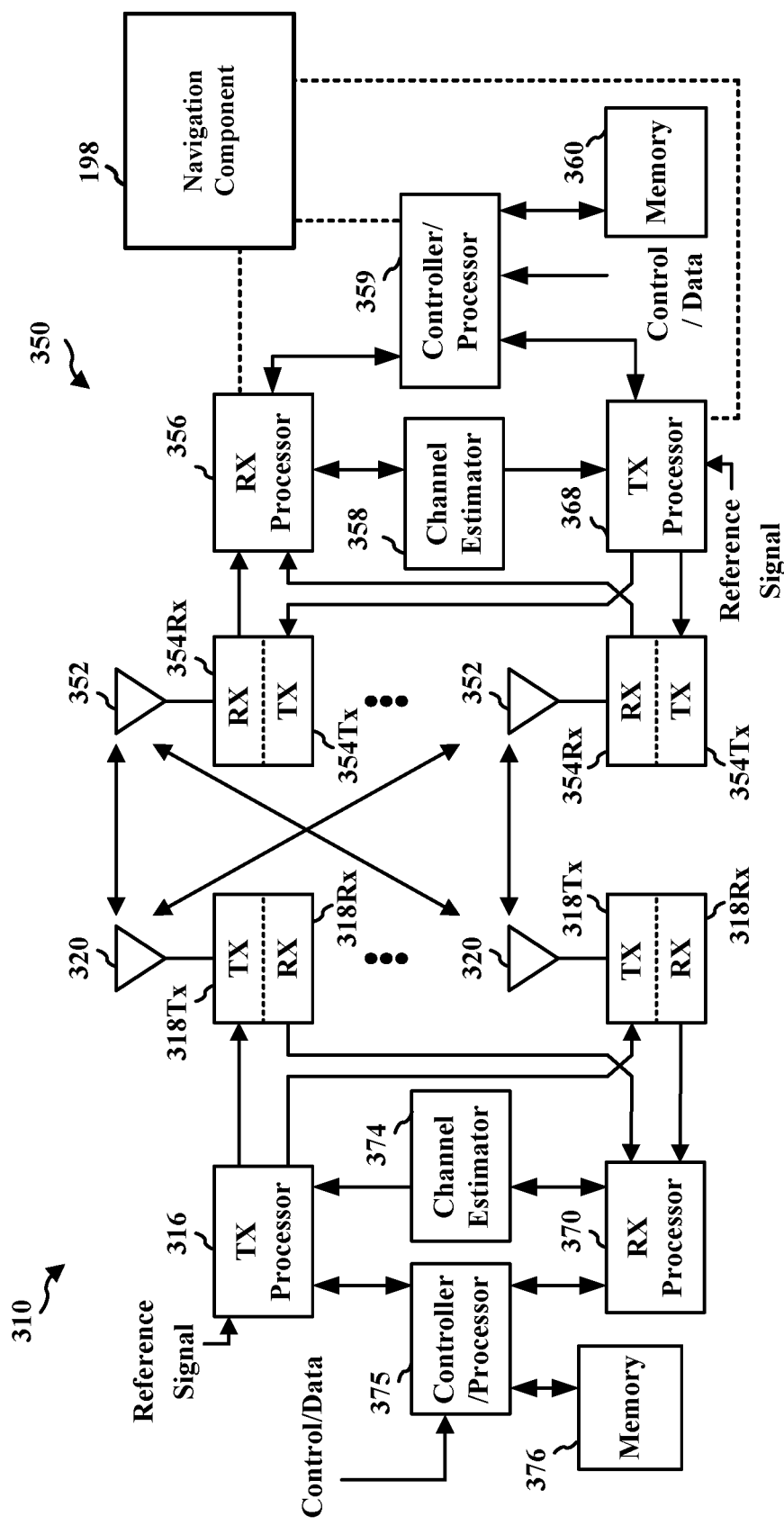
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting;

PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the navigation component 198 of FIG. 1.

Figure 4:
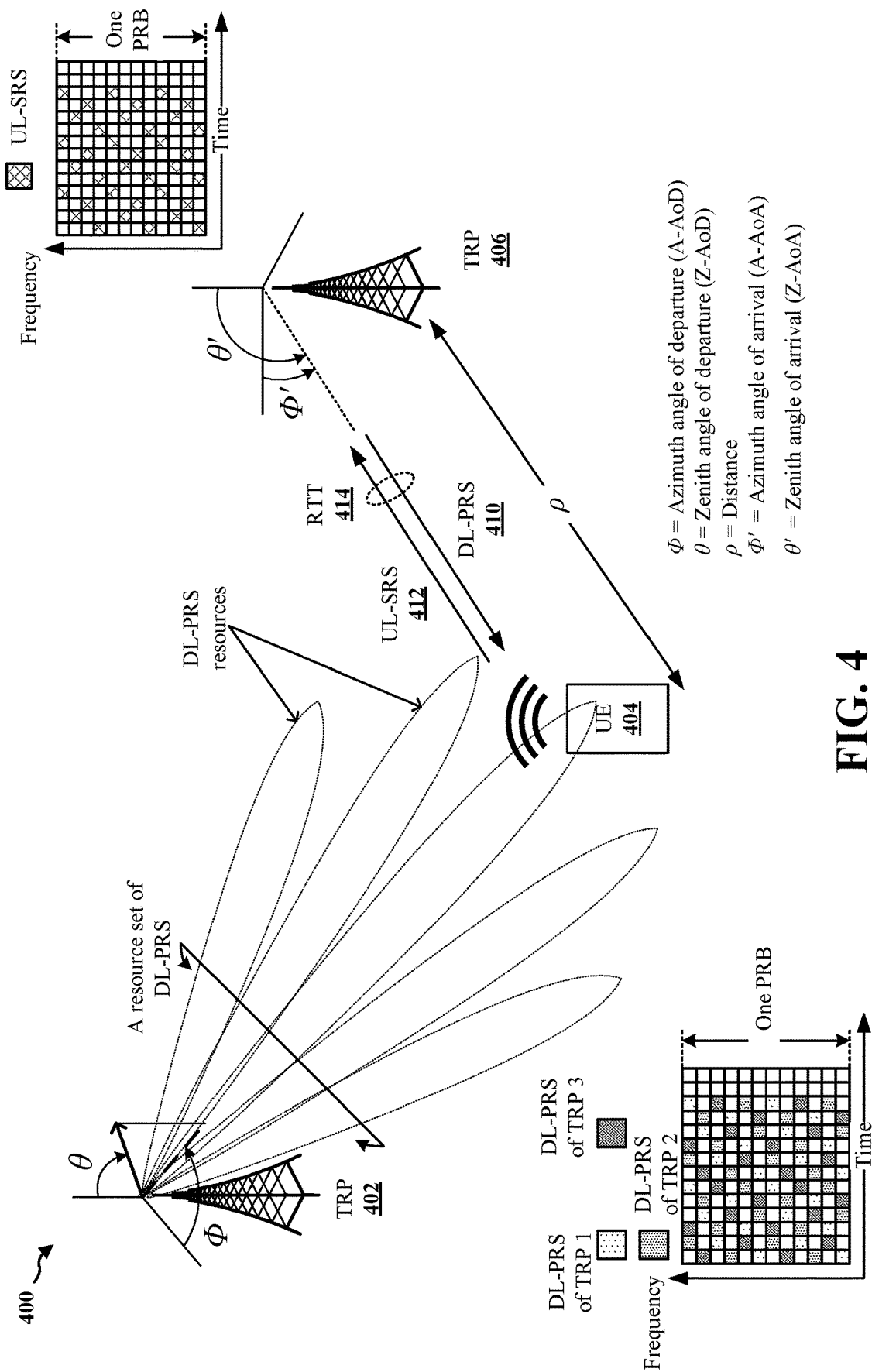
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL-SRS 412 at time $T_{SRS\_TX}$ and receive DL positioning reference signals (PRS) (DL-PRS) 410 at time $T_{PRS\_RX}$. The TRP 406 may receive the UL-SRS 412 at time $T_{SRS\_RX}$ and transmit the DL-PRS 410 at time $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s) 168) or the UE 404 may determine the RTT 414 based on $\|T_{SRS\_RX} - T_{PRS\_TX}| - |T_{SRS\_TX} - T_{PRS\_RX}\|$. Accordingly, multi-RTT positioning may make use of the UE Rx-Tx time difference measurements (i.e., $|T_{SRS\_TX} - T_{PRS\_RX}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_RX} - T_{PRS\_TX}|$) and UL-SRS-RSRP at multiple TRPs 402, 406 of uplink signals transmitted from UE 404. The UE 404 measures the UE Rx-Tx time difference measurements (and/or DL-PRS-RSRP of the received signals) using assistance data received from the positioning server, and the TRPs 402, 406 measure the gNB Rx-Tx time difference measurements (and/or UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and/or DL-PRS-RSRP) of downlink signals received from multiple TRPs 402, 406 at the UE 404. The UE 404 measures the DL RSTD (and/or DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and/or UL-SRS-RSRP) at multiple TRPs 402, 406 of uplink signals transmitted from UE 404. The TRPs 402, 406 measure the UL-RTOA (and/or UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404.

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

In addition to network-based UE positioning technologies, a wireless device (e.g., a base station, a component of the base station, a UE, etc.) may also be configured to include radar capabilities, which may be referred to as "radio frequency (RF) sensing" and/or "cellular-based RF sensing." For example, a wireless device may transmit radar reference signals (RRSs) and measure the RRSs reflected from one or more objects. Based at least in part on the measurement, the wireless device may determine or estimate a distance between the wireless device and the one or more objects. In another example, a first wireless device may also receive RRSs transmitted from a second wireless device, where the first wireless device may determine or estimate a distance between the first wireless device and the second wireless device based at least in part on the received RRS. As such, in some examples, RF sensing techniques may be used for UE positioning and/or for assisting UE positioning. For purposes of the present disclosure, a device that is capable of performing RF sensing (e.g., transmitting and/or receiving RRS for detecting an object or for estimating the distance between the device and the object) may be referred to as an "RF sensing node." For example, an RF sensing node may be a UE, a base station, a component of the base station, a TRP, a device capable of transmitting RRS, and/or a device configured to perform radar functions, etc.

A device equipped with a global navigation satellite system (GNSS) receiver may determine its location based on GNSS measurements (which may also be referred to as "GNSS-based positioning"). GNSS is a network of satellites broadcasting timing and orbital information used for navigation and positioning measurements. GNSS may include multiple groups of satellites, known as constellations, that broadcast signals (which may be referred to as GNSS signals) to control stations and users of GNSS. Based on the broadcast signals, the users may be able to determine their locations (e.g., via trilateration). For purposes of the present disclosure, a device (e.g., a UE) that is equipped with a GNSS receiver or is capable of receiving GNSS signals may be referred to as a GNSS device, and a device that is capable of transmitting GNSS signals, such as a satellite, may be referred to as a space vehicle (SV).

A navigation/map application may refer to an application in a user equipment (UE) (e.g., a navigation system, a smartphone, etc.) that provides navigational directions to a user in real time. A navigation/map application may include a variety of navigation functions which may be used for improving the navigation provided by the navigation/map application. For example, navigation functions may include guiding a user to a destination based on a fastest or a shortest route, fitting a user to a closest road when the exact position of the user is unable to be determined (e.g., the "snap-to-road" feature described in details below), and/or avoiding navigating a user via certain areas (e.g., toll roads, blocked road, roads under constructions, etc.). Over the last few years, users have increasingly relied on navigation/map applications because they have provided various benefits. For example, navigation applications provide convenience to users as they enable the users to find a way to their destinations, and also allow users to contribute information and mark places of importance thereby generating the most accurate description of a location. In some examples, navigation/map applications are also capable of providing expert guidance for users, where a navigation/map application may guide a user to a destination via the best, most direct, or most time-saving routes. For example, a navigation/map application may obtain the current status of traffic, and then locate a shortest and fastest way for a user to reach a destination, and also provide approximately how long it will take the user to reach the destination. As such, a navigation/map application may use an Internet connection and a GPS/GNSS navigation system to provide turn-by-turn guided instructions on how to arrive at a given destination. For purposes of the present disclosure, a navigation map may refer to a map that corresponds to a specific area of the real world, such that the navigation map be used by a navigation/map application for navigating (e.g., guiding) the user via a display when the user is in that specific area. A navigation map may include multiple layers, where each layer may convey different types of information. For example, a first layer of a navigation map may convey geographic (e.g., terrain) information, a second layer of a navigation map may convey road information, and a third layer of a navigation map may convey building information, etc.

In some scenarios, navigational directions given by navigation/map applications for automobiles or mobile equipment (e.g., smartphone, smartwatch, tracking device, etc.) may become dysfunctional if GNSS signal is weak (e.g., below a threshold or undetectable) or sporadic, such as when the automobiles or the mobile equipment are in a structure (e.g., a parking garage, a mall, an underground place, etc.). To alleviate such problem, some navigation/map applications may include a feature, which may be referred to as a "snap-to-road" or "fit-to-road" feature, that enables the navigation/map applications to fit the position of a user to a nearby (or nearest) road/location on a navigation map when the GNSS signal is weak or sporadic. The feature may be similar to a map matching feature that ensures the GNSS data is tied to the road that a user is traveling on and doesn't jitter the user's tracks leading to confusion.

Figure 5:
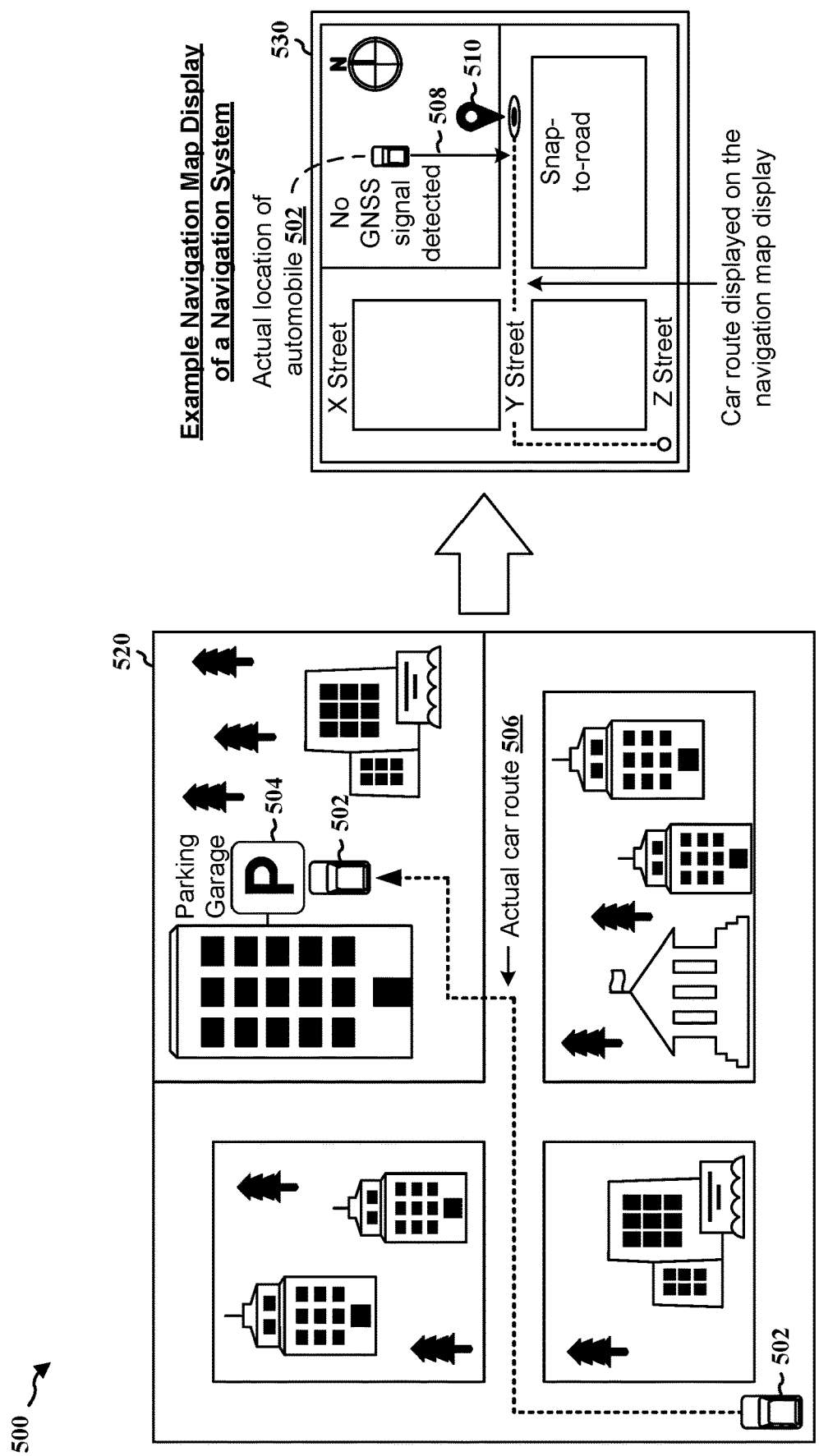
FIG. 5 is a diagram illustrating an example navigation system with fit-to-road feature in accordance with various aspects of the present disclosure.

FIG. 5 is a diagram 500 illustrating an example navigation system with a fit-to-road feature in accordance with various aspects of the present disclosure. As shown at 520, an automobile 502 with a navigation system (e.g., a UE, a smartphone, an on-board GPS system, etc.) may be travelling from an initial position to a parking garage 504 of a building via a route 506. A route (or a navigation route) may refer to a pre-defined path created from a group of location points, which may be used for showing a path from a first point to a second point on a navigation map for which a navigation system/application plans to navigate a user. Location points may be user generated waypoints or points of interest that have been loaded from a map or from a navigation/map application. The navigation system may detect and track the position of the automobile 502 based on GNSS communication (e.g., receiving and measuring GNSS signals) and navigate the user via a navigation map display, such as shown at 530. After the automobile 502 enters the parking garage 504, the GNSS signal may become unavailable. In response, as shown at 508, the navigation system may enable the snap-to-road feature, where the navigation system may fit (or "snap") the position of the automobile 502 to a nearest road on the navigation map display. While the snap-to-road feature may provide better positioning result in many outdoor driving situations, the feature may provide inaccurate, misleading, or even wrong positioning information when the user (e.g., the automobile 502) is out of the GNSS coverage area (e.g., in a building or an underground space).

For example, the navigation system may display that the automobile 502 is at position 510, which may be different than the actual position of the automobile 502. Thus, when the navigation system is activated (e.g., after the automobile 502 starts) or when another device with navigation/map application is connected to the navigation system (e.g., a smartphone connecting to the automobile 502 or the navigation system), the location of the automobile 502 displayed on the navigation map of the navigation system or on the navigation/map application of the another device may not be the actual parked location of the automobile 502, but a location fitted to a nearby road (e.g., at 510). This may cause the navigation system or the navigation/map application to provide inaccurate or wrong navigation directions.

Aspects presented herein may enhance the navigation function(s) of the navigation/map applications or systems when the GNSS signals are weak or sporadic (e.g., under an indoor or underground garage condition). Aspects presented herein may enable a navigation/map application to detect whether a user is in a predefined location when the GNSS signals become unavailable, and the navigation/map application may switch the positioning of the user using a different map layer that corresponds to the predefined location and/or navigate the user using at least one alternative positioning method that is not based on GNSS signals. For purposes of the present disclosure, a predefined location may include a type of building/structure (e.g., a high-rise building, a parking garage, a tunnel, etc.), a place that is associated with a common usage (e.g., a shopping mall, a hospital, a metro station, a convention center), an area (e.g., a tourist attraction, a camping site, etc.), a specific place (e.g., a landmark, a building at a specific address), and/or a portion of a building/structure/place/area (e.g., a floor of a building, a path within a structure, etc.). For example, in one aspect of the present disclosure, a navigation system (e.g., a UE) of an automobile may be able to detect whether the automobile enters a garage (or is under an in-garage condition), and the navigation system may provide or build drivable routes within the garage, such as based on crowd sourcing and/or indoor positioning.

In one aspect of the present disclosure, a navigation system or a navigation/map application (collectively referred to as a "user equipment" or "UE" hereafter) may be configured to determine whether the UE is in a predefined location based on information from at least one sensor (which may be referred to as sensing information hereafter).

Figure 6:
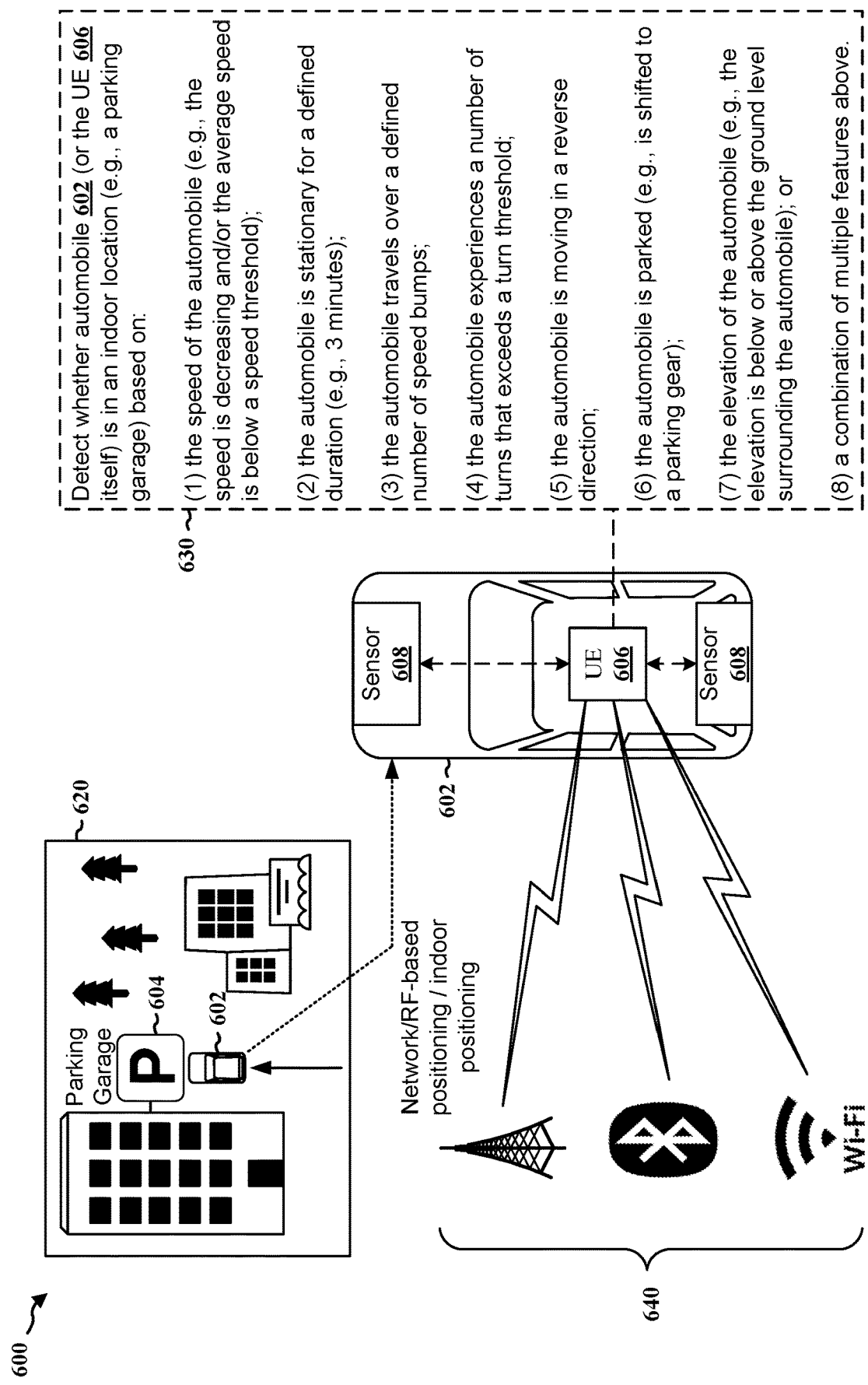
FIG. 6 is a diagram illustrating an example of a UE detecting a predefined location based on sensing information in accordance with various aspects of the present disclosure.

FIG. 6 is a diagram 600 illustrating an example of a UE detecting a predefined location based on sensing information in accordance with various aspects of the present disclosure. An automobile 602 may be associated or equipped with a UE 606, which may be an onboard navigation system or a navigation/map application on a mobile device, where the UE 606 may be configured to detect and track the position of the automobile 602 (or the UE 606 itself) based on GNSS positioning when GNSS signals (e.g., signals transmitted from a GNSS satellite) are available (e.g., above a communication threshold). For example, GNSS signals may be available when a GNSS receiver is able to receive GNSS signals with received power above a received power threshold (e.g., the GNSS receiver may measure the output signal to noise ratio (SNR) with the unit dB per Hz for each GNSS satellite tracked). Based on detecting and tracking the position of the automobile 602, the UE 606 may navigate the user (e.g., driver of the automobile 602) via a navigation map display, such as shown at 530 of FIG. 5.

In one aspect, when the UE 606 is unable to receive GNSS signals or the received GNSS signals are below a threshold, the UE 606 may be configured to detect whether the UE 606 is in a specified building or location based on detecting one or more features, signatures, conditions, and/or factors (collectively as "features" hereafter) associated with the building or the location. For example, as shown at 620, when the automobile 602 enters a parking garage 604 where GNSS signals are weak or unavailable (e.g., the parking garage 604 is indoor or underground), the UE 606 may be configured to detect whether the automobile 602 is in a parking garage (or under an in-garage condition) based on identifying whether one or more features associated with a parking garage can be detected. In addition, if the UE 606 has enabled the "snap-to-road" feature, the UE 606 may be configured to disable the "snap-to-road" feature to avoid placing or fitting the positioning of the automobile 602 to an inaccurate location.

In one example, as certain sensor(s) on an automobile may be configured to stay always-on or periodically, the one or more features for detecting whether the automobile 602 is in a parking garage may be based on information obtained from at least one sensor 608 of the automobile 602. For example, as shown at 630, the one or more features that may be used for detecting whether the automobile 602 is in a parking garage may include: (1) the speed of the automobile (e.g., the speed is decreasing and/or the average speed is below a speed threshold for a defined duration); (2) the automobile is stationary for a defined duration (e.g., 3 minutes); (3) the automobile travels over a defined number of speed bumps (and additionally within a defined period); (4) the automobile experiences a number of turns that exceeds a turn threshold (and additionally within a defined period); (5) the automobile is moving in a reverse direction or the gear is shifted to the reverse gear; (6) the automobile is parked (e.g., the gear is shifted to the parking gear or a brake of the automobile is engaged and the automobile is not moving); (7) the elevation of the automobile (e.g., is below or above the ground level surrounding the automobile); or (8) a combination thereof.

The at least one sensor 608 that may be used for measuring or detecting the one or more features may include, and is not limited to, inertial measurement unit (IMU), speed and velocity censor, gyroscope, compass, engine speed sensor, accelerometer, odometer, barometer, camera, motion sensor, force and torque sensor, and/or position sensor, etc. For example, the speed of the automobile may be detected using the speed and velocity sensor or the IMU, whether the automobile is stationary may be detected using the motion sensor or the speed and velocity sensor, and the elevation of the automobile may be detected using the barometer, etc. In some examples, information from the on-board diagnostic (OBD) or car electronic monitoring system of an automobile may also be used for identifying the one or more features. For example, the car electronic monitoring system may be able to provide information such as current gear of the automobile (e.g., forward, reverse, neutral or parked, etc.), whether the automobile is on/off, whether the wheel has turned, etc.

In some examples, each of the one or more features may further be assigned or associated with a level of indication that the automobile is in a predefined location (e.g., the parking garage). For example, the gear of the automobile being shifted to a parking gear (e.g., the automobile is parked) may be assigned with a high/higher level indication (e.g., the automobile is very likely to be in a parking garage), whereas the automobile travels over a defined number of speed bumps (within a defined time period) may be assigned with a low/lower level indication (e.g., the automobile may be in a parking garage).

In another example, as shown at 640, the one or more features for detecting whether the automobile 602 is in a parking garage may be based on non-GNSS-based positioning, such as network-based positioning or indoor positioning (e.g., Wi-Fi positioning, Bluetooth positioning, ultra-wide-band (UWB) positioning, etc.). For example, after the UE 606 is unable to receive GNSS signal or the received GNSS signal is below a threshold, the UE 606 may switch to network-based positioning to determine whether it is in a predefined location (e.g., based on the location identified in a map). As such, when GNSS signal is lost, the UE 606 may use sensor(s) and network communication to identify whether the automobile 602 has entered a garage.

In another aspect of the present disclosure, a UE may be configured to determine whether the UE is in a predefined location based on images captured by a camera or a video recorder. The images may be captured using the camera/video recorder on the UE, or obtained via the camera/video recorder of another device. For example, one or more features extracted from images of a predefined location (e.g., a structure, a building, or a landmark, etc.) may be used for identifying the predefined location. The extraction of features and identification of the predefined location may be trained based on machine learning (ML) and artificial intelligence (AI).

Figure 7:
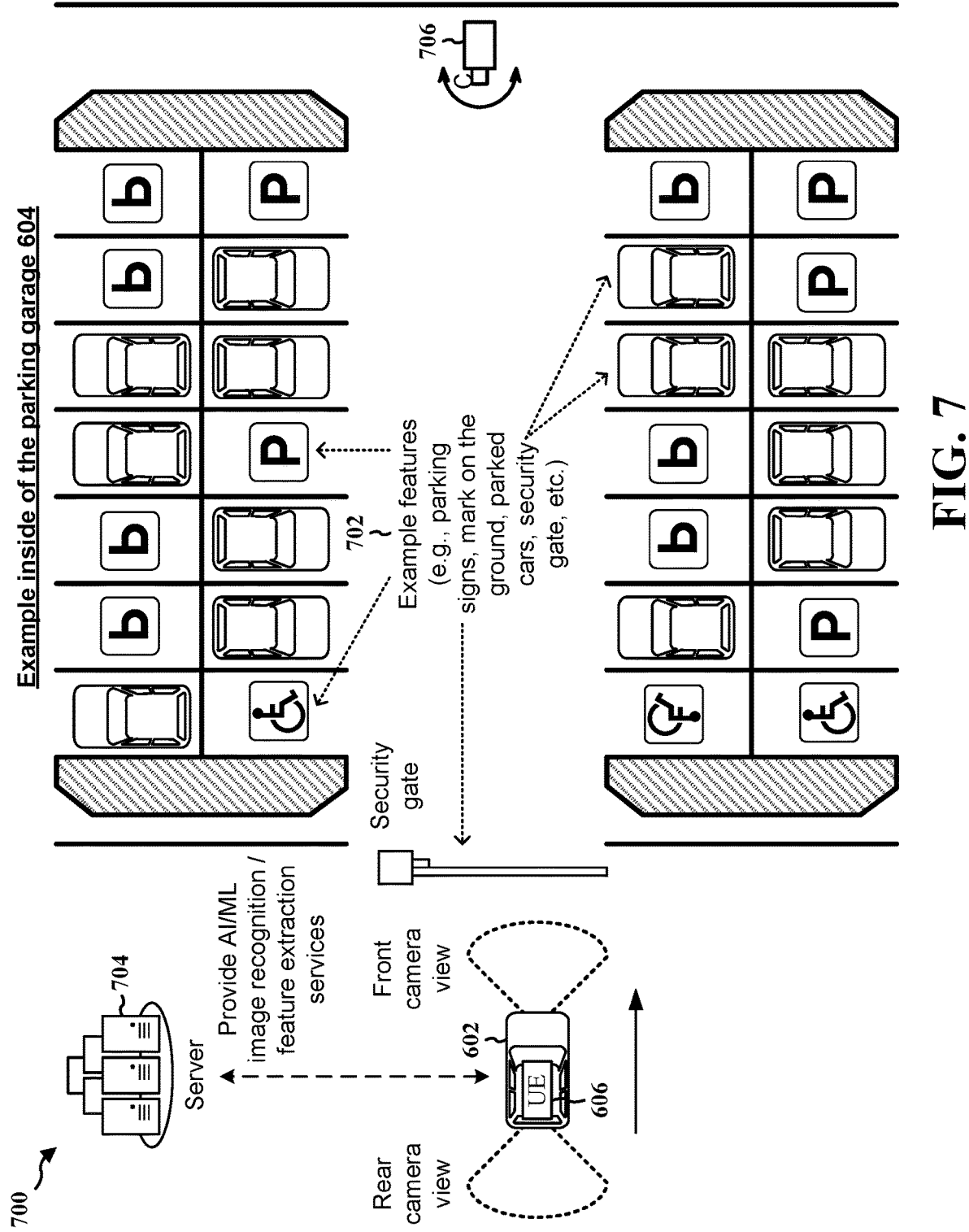
FIG. 7 is a diagram illustrating an example of a UE detecting a predefined location based on images captured from camera or video recorder in accordance with various aspects of the present disclosure.

FIG. 7 is a diagram 700 illustrating an example of a UE detecting a predefined location based on images captured from camera or video recorder in accordance with various aspects of the present disclosure. As a camera has become a common component on many devices, the UE 606 may be configured to monitor its surrounding environment using its camera(s) or camera(s) on the automobile 602. For example, the automobile 602 may include at least a front camera and a rear camera that is capable of capturing the front view and the rear view of the automobile 602, respectively. Then, based on the images captured by the camera, the UE 606 may determine whether the automobile 602 (or the UE 606 itself) is in a predefined location based on whether the images include one or more features associated with the predefined location.

For example, as shown at 702, one or more features associated with a parking garage may include parking signs, marks on the ground (e.g., handicapped marks, parking marks, parking space numbering, etc.), parked cars, number of parked cars, orientation of other cars, parking garage gate/door, and/or other objects, etc. Thus, if the images captured by the UE 606 identify the one or more features (or a combination of the one or more features), the UE 606 may determine that the automobile 602 is in a parking garage. In one example, the determination may be AI/ML based with algorithm running at the automobile 602 or at a server 704, where the algorithm may provide feature extraction and image recognition related services. In another example, if images captured by the UE 606 is insufficient or if the UE 606 does not have a camera, the UE 606 may request more surveillance from sensors on the automobile (e.g., using cameras on the automobile 602) or its own internal sensors (e.g., IMU, accelerometer).

In another example, images captured by other devices/UEs may also be used for identifying the location of the automobile 602. For example, the parking garage 604 may include security camera 706 that monitor inside the parking garage 604. If the security camera 706 (or a server associated with the security cameras 706) identifies the automobile 602 (e.g., based on its license plate), the security camera 706 or the server may inform the UE 606 that the automobile 602 is in the parking garage 604.

In another aspect of the present disclosure, a UE may be configured to determine whether the UE is in a predefined location based on map matching. For example, if a UE is in proximity to a known location on a navigation map when the UE is unable to receive GNSS signals or the received GNSS signals are below a threshold, the UE may determine or may bias to determining that it is in the known location.

Figure 8:
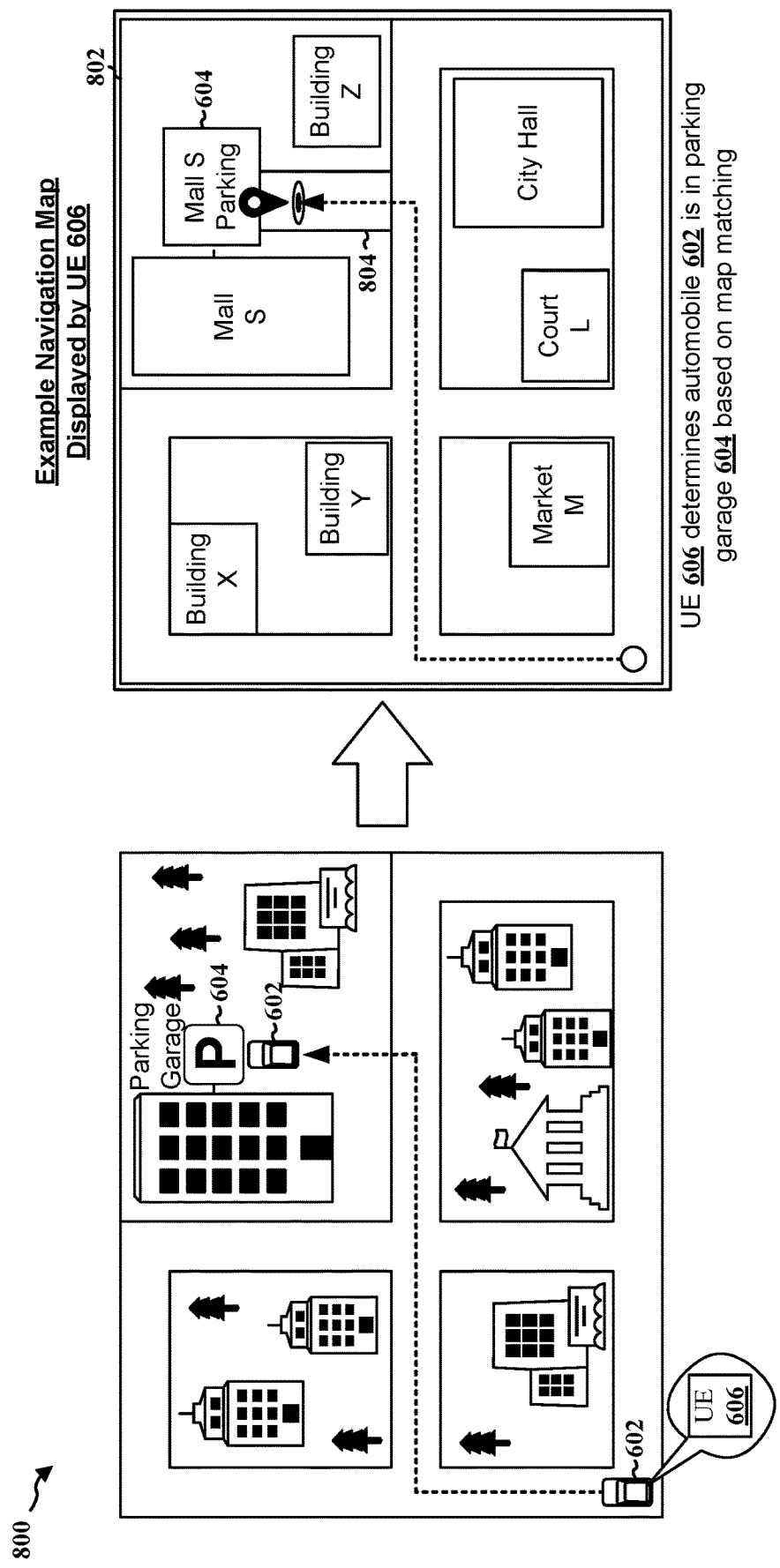
FIG. 8 is a diagram illustrating an example of a UE detecting a predefined location based on map matching in accordance with various aspects of the present disclosure.

FIG. 8 is a diagram 800 illustrating an example of a UE detecting a predefined location based on map matching in accordance with various aspects of the present disclosure. As shown at 802, the navigation map used by the UE 606 may include mapping information associated with the parking garage 604 (e.g., the location is marked as a parking garage or as a parking garage for a mall S on the navigation map (e.g., based on public data or crowd sourced data)). As such, when the UE 606 enters the parking garage 604 and is unable to receive GNSS signals, as the last detected location of the UE 606 is in proximity to the parking garage 604, the UE 606 may be biased toward determining that the automobile 602 (or the UE 606 itself) is in the parking garage 604 or is under an in-garage condition. In another example, if the parking garage 604 has a drive way 804 leading to its edge, and GNSS signal is lost soon after the automobile 602 enters the parking garage, the UE 606 may also determine that it enters into the parking garage 604.

In another aspects of the present disclosure, a UE may determine whether the UE is in a predefined location based on crowd-sourced (or crowd-sourcing) information. Crowd-sourcing may refer to mechanism for collecting information (which may be referred to as crowd-sourcing information) from a group of UEs, usually via an online server. For example, crowdsourcing may involve obtaining sensing information, location information, or images captured from a large group of UEs that submit their data to a crowd-sourcing server or an Internet (e.g., social medias, mobile applications, etc.). Based on the information collected, the crowd-sourcing server may aggregate the information, analyze the information, and determine which set(s) of information may be useful or has good credibility to other devices. For example, a crowd-sourcing server may collect weather condition reported by a group of UEs within a region in real time. Based on the weather condition received from the group of UEs, the crowd-sourcing server may be able to determine the current weather condition for the region, and the crowd-sourcing server may share such crowd-sourcing information with other UEs (e.g., UEs that are planning to go to the region).

Figure 9:
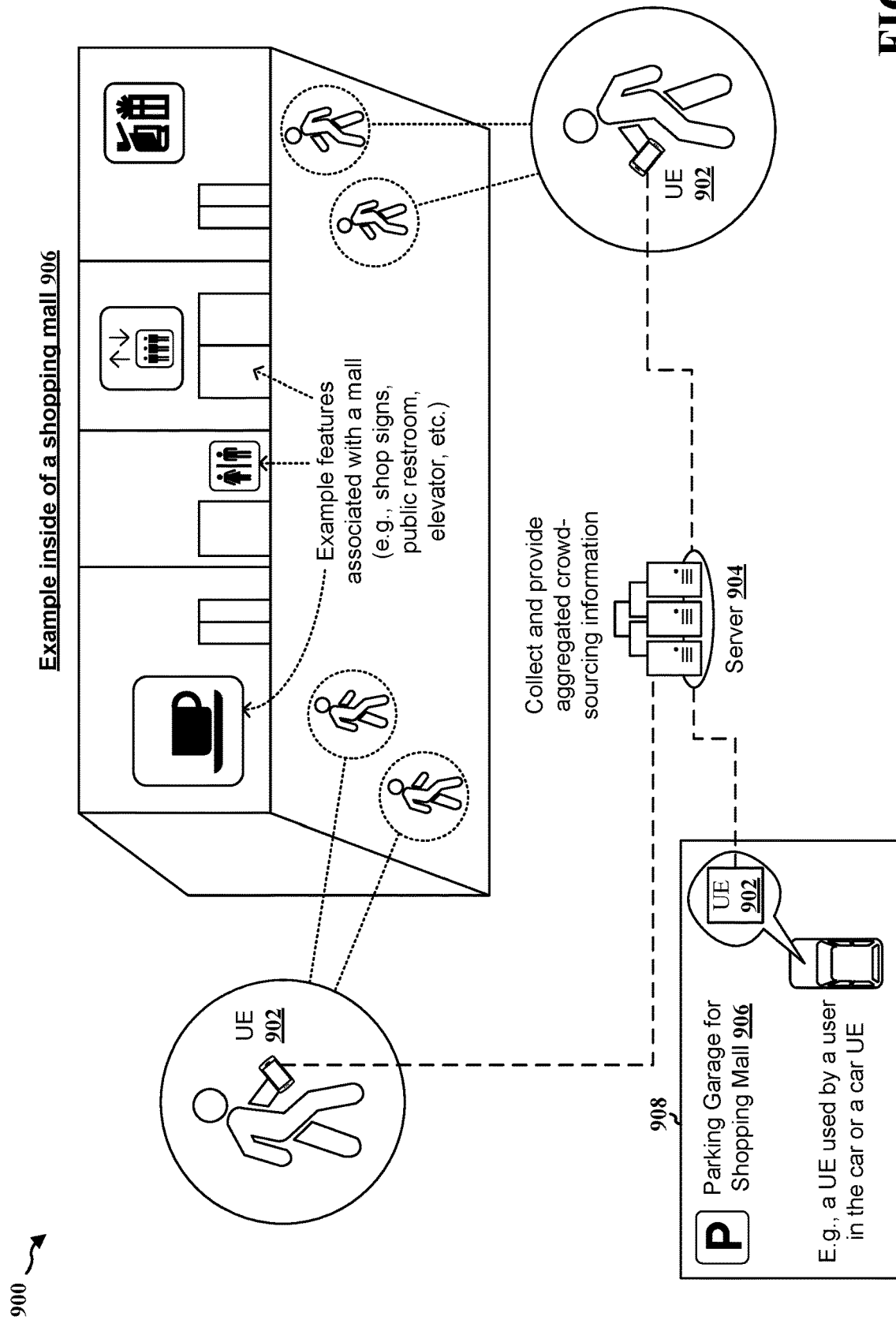
FIG. 9 is a diagram illustrating an example of a UE detecting a predefined location based on crowd-souring in accordance with various aspects of the present disclosure.

FIG. 9 is a diagram 900 illustrating an example of a UE detecting a predefined location based on crowd-souring in accordance with various aspects of the present disclosure. A plurality of UEs 902 (e.g., smartphones/smartwatches used by users and/or vehicle UEs) may be configured to collect information related to their surroundings, such as images of their surroundings, measurements from their sensors (e.g., speed, elevation, and/or orientation of their users), and/or approximate number of users within a range (e.g., based on RF sensing), etc. Then, the UEs 902 may transmit the collected information to a server 904 (e.g., a crowd-sourcing server), where the server may aggregate and analyze the collected information received from the UEs 902. In some examples, uploading information to the server 904 may be automatic without user input (e.g., based on users' consent), and the uploading may be periodic and/or non-real time (e.g., overnight).

For example, a first UE inside a shopping mall 906 may collect and provide images inside the shopping mall 906, which may include various features associated with a shopping mall (e.g., shop signs, public restroom signs, elevator, etc.). A second UE inside the shopping mall 906 may detect and provide its location information and captured images (e.g., via social media check-in features). A third UE that is also inside the shopping mall 906 may provide its location information along with the speed and elevation of its user. As shown at 908, a fourth UE may be inside the parking garage of the shopping mall 906, where the fourth UE may be a user using the UE in a vehicle or a vehicle UE (e.g., a build-in UE). Similarly, the fourth UE may also collect and provide images inside the parking garage and provide its location information along with the speed and elevation of the vehicle (e.g., the number of vehicles in the parking garage may also be used to infer the congestion level of the shopping mall 906). Based on information collected from the first UE, the second UE, the third UE, and the fourth UE, the server 904 may derive a set of features associated with the shopping mall 906 and/or its parking garage, such as combination of signs in the shopping mall 906, the elevation of the shopping mall 906, average speed of users walking in the shopping mall 906, number of parking spaces, number of parked cars, etc. As such, when a UE enters into the shopping mall 906, the UE may detect that it is in the shopping mall 906 (e.g., a predefined location) based on detecting one or more features associated with the shopping mall 906, such as described in connection with FIGS. 6 to 8. In other words, the one or more features associated with a predefined location may be collected based on information provided by multiple UEs in the predefined location or in proximity to the defined location.

In another aspect of the present disclosure, in addition to detecting that a UE is in a predefined location, the UE may further be configured to provide additional information regarding the predefined location, such as a navigation map associated with the predefined location, one or more objects in the predefined location, one or more transient features associated with the predefined location, and/or services available in the predefined location, etc.

Figure 10:
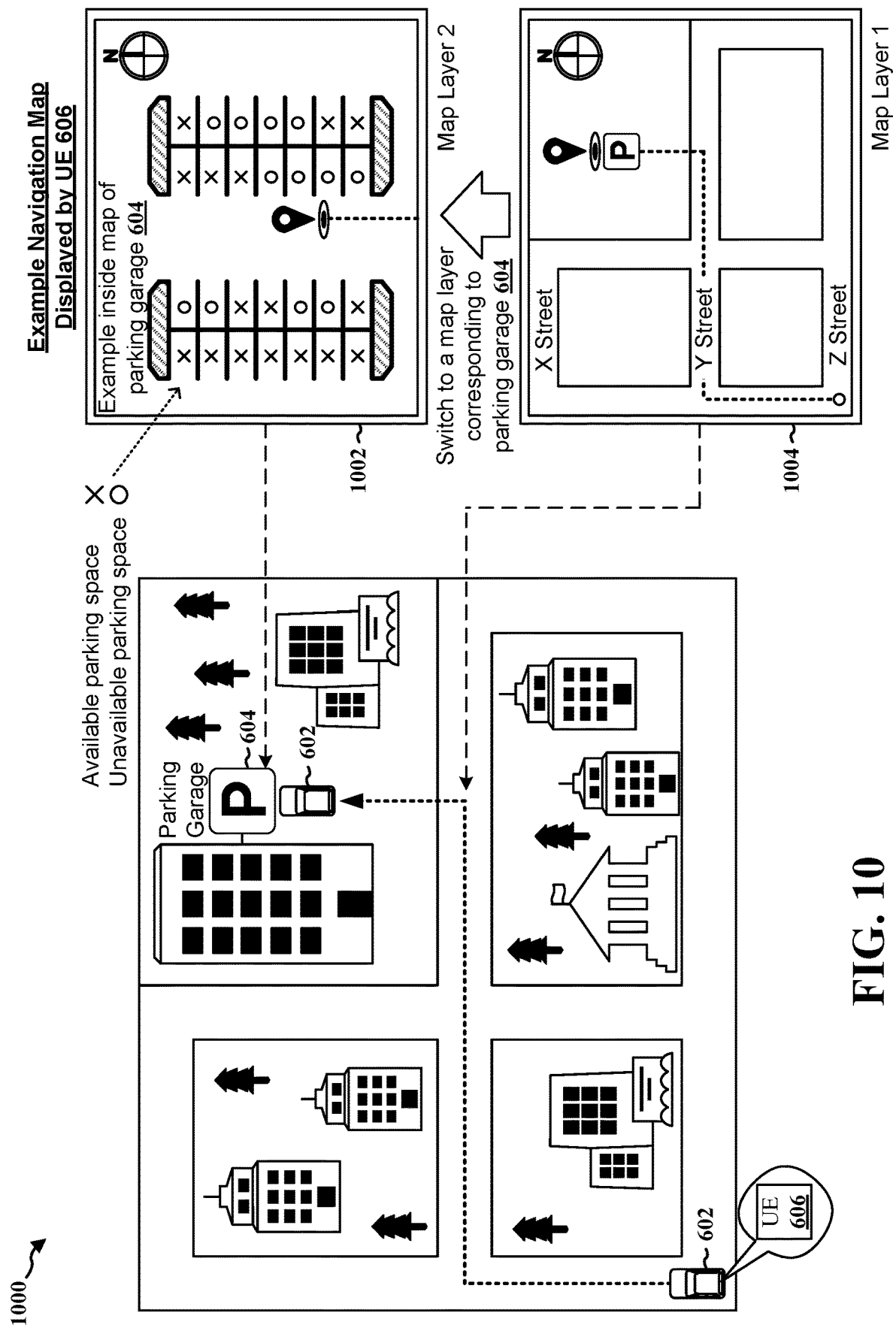
FIG. 10 is a diagram illustrating an example of a UE providing additional information for a predefined location after detecting that the UE is in the predefined location in accordance with various aspects of the present disclosure.

FIG. 10 is a diagram 1000 illustrating an example of a UE providing additional information for a predefined location after detecting that the UE is in the predefined location in accordance with various aspects of the present disclosure. In one example, after the automobile 602 enters the parking garage 604 and the UE 606 detects that the automobile 602 (or the UE 606 itself) is in the parking garage 604 (e.g., based on aspects/methods described in connection with FIGS. 6 to 9), the UE 606 may provide additional information associated with the parking garage 604.

For example, as shown at 1002, after determining that the automobile 602 is in the parking garage 604, the UE 606 may load a map that corresponds to the parking garage 604. In other word, the UE 606 may switch from displaying a first map layer (as shown at 1004) to displaying a second map layer (as shown at 1002), where the second map layer may be a sub-layer of the first map layer. In addition, if the UE 606 has enabled the "snap-to-road" feature on the first map layer, the UE 606 may be configured to disable the "snap-to-road" feature for the first map layer, such that the UE 606 may avoid fitting or snapping the automobile 602 to a nearby road on the first map layer. Then, the UE 606 may continue to navigate the user inside the parking garage 604 using the map that corresponds to the parking garage 604 (e.g., the second map layer). In some examples, if the parking garage 604 has multiple floors, the UE 606 may also load the corresponding (sub-level) floor map based on detecting the elevation of the automobile 602 (or the UE 606). The navigation may be based on non-GNSS-based positioning, such as network-based positioning, indoor positioning, and/or dead reckoning (DR), etc. In navigation, DR may refer to a process of calculating current position of a moving object by using a previously determined position, or fix, and then incorporating estimates of speed, heading direction, and course over elapsed time, which may be measured or obtained via sensors of the automobile 602 or the UE 606 (e.g., IMU, camera, inertia sensor, speed and velocity sensor, etc.).

In another example, information gathered from other devices or from a server (e.g., the crowd-sourcing information from other UEs as described in connection with FIG. 9) may also be utilized/leveraged by the UE 606 for providing its user with additional information related to the parking garage 604. For examples, UEs within the parking garage 604 may upload their user data (e.g., images, sensing information, location information, etc.) to a server (e.g., a crowd-sourcing server, the server 904, etc.). The uploading of the user data may be periodic or event driven, e.g., after detecting that the UE is in the parking garage or likely under in-garage situation, or after detecting there is a sudden jump in a chosen location after a period of no GNSS fix (e.g., likely getting out of the parking garage). Also, to protect user privacy, such data upload may be configured to be sign-in based, and data upload may be anonymized. Then, the server may aggregate user data gathered from multiple UEs, and the server may provide the aggregated data (or features/additional information extracted from the aggregated data) to the UE 606.

For example, multiple UEs may provide information related to which parking space(s) are unavailable (e.g., have cars parked) and/or which parking space(s) are available (e.g., have no cars parked) to a server based on RF sensing, image recognition, sensor measurements, or other detection mechanisms. UEs may also report their driving status, e.g., whether they are parked, moving, forward/reverse, etc., such that a server may determine approximately how many cars are currently parked in the parking garage 604 or whether the parking garage is congested 604 (e.g., a large number of vehicles in the parking garage 604 are moving). In some examples, information associated with the parking garage 604 may also be provided by the parking garage owner, such as via available parking space monitoring system (e.g., system showing which spaces are parked or available), and/or based on street survey. Then, the server may aggregate this information and provide the aggregated information to the UE 606. As such, the UE 606 may display to its user via a navigation map which parking space(s) are available and/or are unavailable within the parking garage 604, such as shown at 1002, and/or the UE 606 may determine the current traffics within the parking garage 604, etc.

As described in connection with FIG. 7, AI/ML mechanisms may be used for capturing and extracting data from all the sensors: GNSS, IMU, gyroscope, wheel ticks/odometer, compass, camera, barometer, steering wheel information, etc. The data gathered may be configured to last for a defined period of time to avoid data become obsolete/outdated, which may cause false alarm. In some examples, the AI/ML learning and training may be based on online training. For example, the AI/ML may make an initial determination regarding whether a feature is associated with a predefined location and request a user to provide a user input (e.g., whether the determination is correct). Then, the user input may be used by the AI/ML for training. In other examples, the AI/ML learning and training may be based on offline training, where an AI/ML algorithm may be downloaded from a server (e.g., trained at the server). In another example, a hybrid algorithm may also be implemented where both local training and server training are used to further enhance the AI/ML training.

Figure 11:
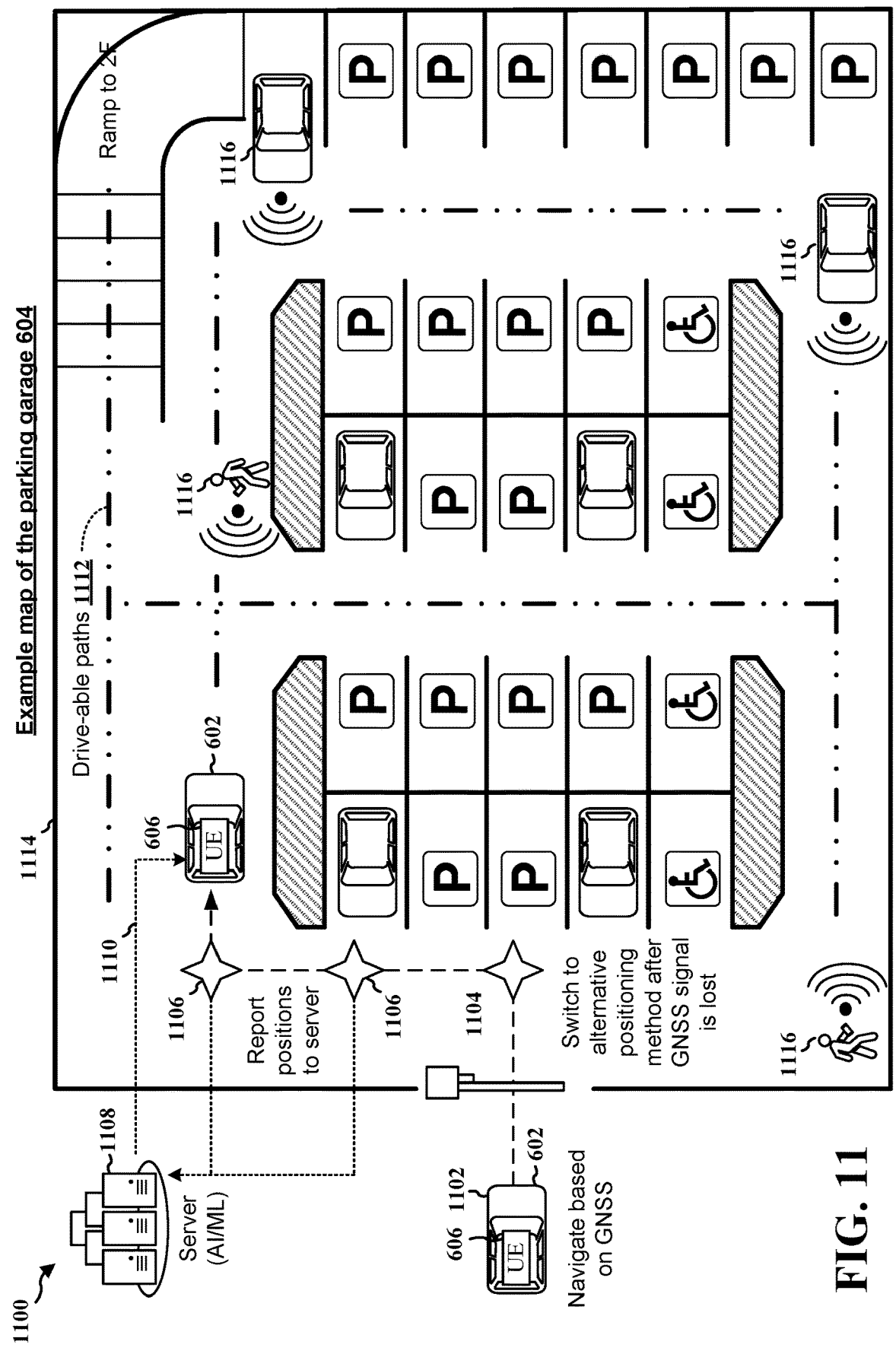
FIG. 11 is a diagram illustrating an example scenario where artificial intelligence (AI)/machine learning (ML) is combined with the crowd-sourcing mechanism in accordance with various aspects of the present disclosure.

FIG. 11 is a diagram 1100 illustrating an example scenario where AI/ML is combined with a crowd-sourcing mechanism in accordance with various aspects of the present disclosure. As shown at 1102, the UE 606 may be monitoring/tracking the position of the automobile 602 (or the UE 606 itself) based on GNSS positioning prior to the automobile 602 enters into the parking garage 604 (e.g., when GNSS signals are available).

As shown at 1104, after the automobile 602 enters into the parking garage 604 and the UE 606 is unable to detect GNSS signals or the GNSS signals received are below a communication threshold, the UE 606 may identify whether it is in a predefined structure based on aspects/methods described in connection with FIGS. 6 to 10. For example, the UE 606 may determine that the automobile 602 (or the UE 606 itself) is in the parking garage 604 based on sensing information or images captured via sensors of the automobile 602.

As shown at 1106, after determining that the automobile 602 is in the parking garage 604, the UE 606 may further determine a position or series of positions of the automobile 602 via non-GNSS-based positioning or sensor(s) (e.g., indoor positioning, IMU, network-based positioning, UWB positioning, etc.). In one example, the UE 606 may provide the determined position or series of positions of the automobile 602 to a server 1108 (e.g., a location server). In response, as shown at 1110, the server 1108 may determine drive-able paths 1112 associated with the parking garage 604, where GNSS is not available or intermittently available. Then, the server 1108 may generate a map 1114 (e.g., a navigation map) associated with the parking garage 604 and provided the map 1114 (including the drive-able paths 1112) and corresponding mapping information to the UE 606, where the map 1114 may be provided as an additional map layer onto an ordinary map (e.g., the map shown at 1004 of FIG. 10). In one example, once a new/additional map (or a new/additional layer of map) is loaded onto the UE 606, the UE 606 may also apply a snapping feature that is similar to the snap-to-road (or snap-to-map) feature described in connection with FIG. 5, where the position of the automobile is automatically fit (e.g., "snapped") to the nearest route/path available within the new/additional map. Such snapping feature may be referred to as snap-to-indoor-path feature. In addition, the UE 606 may also be configured to prevent the positioning of the automobile 602 to be snapped to outside of the parking garage 604 (e.g., to the previous map) as long as the position of the automobile 602 is unable to be determined based on GNSS positioning. In some examples, the-snap to-road feature may also be used by the UE 606 or the automobile 602 for calibrating the sensor output.

In another example, the server 1108 may also provide a map layer or information for transient features associated with the parking garage 604 to the UE 606, e.g., features that may not be permanent or may be based on events, such as parking space availability, barriers in the parking garage, traffic congestion level, etc. The transient features may be based on data collected from other UEs or entities 1116 (e.g., via crowd-sourcing, public available information, authorities, owners, etc.) in real time, such as described in connection with FIGS. 9 and 10. This information or map layer for transient features may be configured to be temporary (e.g., expires after a defined time duration or after an event ends) to avoid the map layer providing outdated information. For example, the time duration may be based on an expected duration of an event (e.g., duration of a sporting game, where the parking garage may be more congested compared to other times). In addition, the generation of additional information or map layer, the collection of crowd-sourcing data, and/or the aggregation of crowd-sourcing data may be performed using AI/ML, which may be implemented at the server 1108.

In some scenarios, a portion of a parking structure (e.g., part of the parking structure, structure above or below the parking structure, etc.) may be designated for pedestrians and/or bicycles. In one example, pedestrian dead reckoning (PDR) may be used by a UE to provide identification of mobility mode (e.g., walking, cycling, etc.) to a server. In response, the server may provide map(s) that are associated with the current modality (e.g., a map with pedestrian paths is provided if walking is detected, and a map with cycling path is provided if cycling is detected, etc.). The server may also provide map(s) associated with other types of mobility depending on the configuration (e.g., a map that includes both pedestrian and cycling paths).

In addition, if a predefined location has multiple floors, a UE may use a barometer or other types of sensors to determine when to switch between map layers for navigation (e.g., when change in floor is detected based on change in air pressure) and/or when the modality appears to have changed (e.g., a user's gait is detected or identified). The UE or the server may determine which level of a multi-level structure is the UE located and load the corresponding information (e.g., walking path, bicycle way, etc., to the UE. In addition, the UE may also calibrate the barometer or other types of sensors based on crowd-sourcing information (e.g., air pressure measured at the same floor level by multiple UEs are likely to be the same).

In other examples, the UE (e.g., the UE 606) may also provide additional services to a user once the UE is able to recognize that it is in a predefined structure (e.g., the parking garage 604). For example, referring back to FIG. 11, the UE 606 may remember the level of the parking structure and store the information if the user leaves the automobile 602. The UE 606 may also note available parking spaces, and/or the location of elevators and stairs for pedestrian access, etc. In addition, in navigating the user inside the parking garage 604, the UE 606 may be configured to prioritize parking closer to noted structures or point of interest based on user priority/selection (e.g., close to handicapped parking space, close to certain exits, etc.). These additional and enhanced navigation features may also be used as incentives for users to upload or share their data (e.g., location data, sensing information, images captured) voluntarily.

In some examples, raw picture captured by UEs may be pre-processed (e.g., by AI/ML). For example, raw pictures of the parking garage 604 may be segmented, marked with point of interest (e.g., parking space, exit, handicapped spaces), and/or marked according to user priority, etc.

Figure 12:
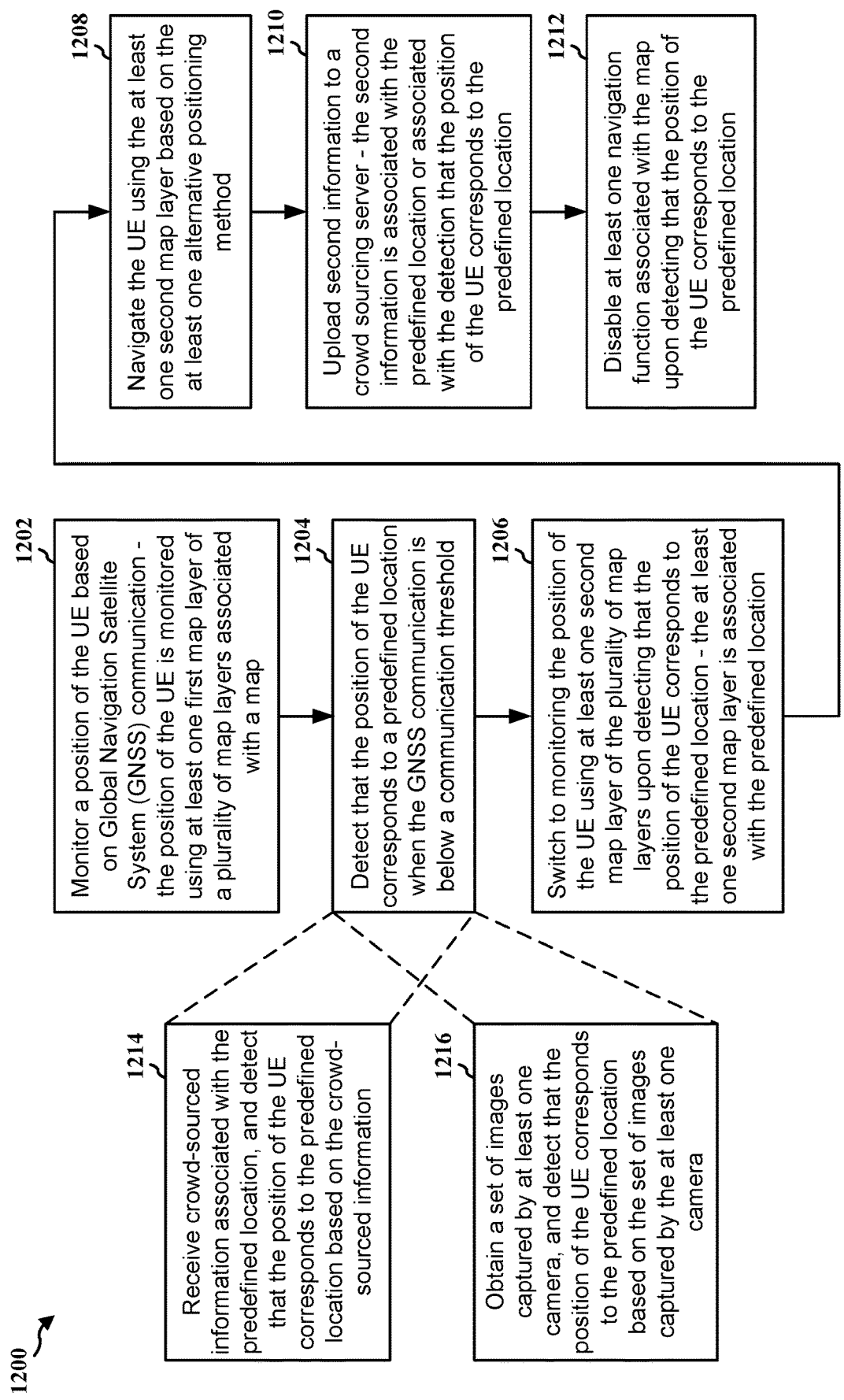
FIG. 12 is a flowchart of a method of wireless communication.

FIG. 12 is a flowchart 1200 of a method of wireless communication. The method may be performed by a UE (e.g., the UE 104, 404, 606, 902; the apparatus 1404). The method may enable the UE, which may be a navigation system or a device running a navigation/map application, to detect whether the UE is in a predefined location when the GNSS signals become unavailable, and the UE may switch the positioning of the UE using a different map layer that corresponds to the predefined location and/or navigate a user using at least one alternative positioning method that is not based on GNSS signals.

At 1202, the UE may monitor a position of the UE based on GNSS communication, where the position of the UE may be monitored using at least one first map layer of a plurality of map layers associated with a map, such as described in connection with FIGS. 6 and 10. For example, as shown by FIG. 10, the UE 606 may monitor the position of the automobile 602 (or the UE 606 itself) based on GNSS communication, where the position of the automobile 602 may be monitored using a first map layer as shown at 1004. The monitoring of the position of the UE based on GNSS communication may be performed by, e.g., the navigation component 198, the cellular baseband processor 1424, and/or the transceiver(s) 1422 of the apparatus 1404 in FIG. 14.

In one example, the map is associated with at least one of a navigation application or a map application.

At 1204, the UE may detect that the position of the UE corresponds to a predefined location when the GNSS communication is below a communication threshold, such as described in connection with FIGS. 6 to 11. For example, as shown by FIG. 6, the UE 606 may detect that the position of the automobile 602 corresponds to the parking garage 604 when the GNSS communication is unavailable or below a communication threshold. The detection of that the position of the UE corresponds to a predefined location when the GNSS communication is below a communication threshold may be performed by, e.g., the navigation component 198, the cellular baseband processor 1424, and/or the transceiver(s) 1422 of the apparatus 1404 in FIG. 14.

In one example, the GNSS communication being below the communication threshold corresponds to a level of detectability of the GNSS communication, and where the GNSS communication is undetectable below a certain level of the communication threshold.

In another example, the predefined location corresponds to an indoor location (e.g., a parking garage), and the UE may detect that the position of the UE corresponds to the parking garage based on detecting that: the UE travels over a defined number of speed bumps, the UE is stationary for a defined duration, a velocity of the UE is decreasing, the UE experiences a number of turns that exceeds a turn threshold, the UE is moving in a reverse direction, the UE is parked, a change in elevation of the UE, or a combination thereof.

In another example, as shown at 1214, to detect that the position of the UE corresponds to the predefined location, the UE may receive crowd-sourced information associated with the predefined location, and the UE may detect that the position of the UE corresponds to the predefined location based on the crowd-sourced information.

In another example, as shown at 1216, to detect that the position of the UE corresponds to the predefined location, the UE may obtain a set of images captured by at least one camera, and the UE may detect that the position of the UE corresponds to the predefined location based on the set of images captured by the at least one camera. In such an example, to obtain the set of images captured by the at least one camera, the UE may receive the set of images captured by the at least one camera, where the at least one camera is located at a source outside the UE, or the UE may capture the set of images with the at least one camera, where the at least one camera is located at the UE. In such an example, the set of images includes at least one image of: a front view of a vehicle, a rear view of the vehicle, one or more parking signs, one or more parked cars, one or more marks or symbols, or a combination thereof.

In another example, the detection that the position of the UE corresponds to the predefined location is based on a data collection procedure including at least one of ML or AI. In such an example, the data collection procedure is based on data captured from at least one sensor associated with the UE, and the detection that the position of the UE corresponds to the predefined location is further based on the data captured from the at least one sensor. In such an example, the data captured from the at least one sensor corresponds to:

data associated with the GNSS communication, data from an IMU, data from a gyroscope, data from an odometer, data from a compass, data from a camera, data from a barometer, data associated with a steering wheel of a vehicle, or a combination thereof.

In another example, the UE may detect that the position of the UE corresponds to the predefined location based on a map matching procedure.

At 1206, the UE may switch to monitoring the position of the UE using at least one second map layer of the plurality of map layers upon detecting that the position of the UE corresponds to the predefined location, where the at least one second map layer may be associated with the predefined location, such as described in connection with FIGS. 10 and 11. For example, as shown by FIG. 10, the UE 606 may switch to monitoring the position of the automobile 602 using a second map layer upon detecting that the automobile 602 is in the parking garage 604, where the second map layer corresponds to the parking garage 604. The switching of the monitoring the position of the UE using at least one second map layer may be performed by, e.g., the navigation component 198, the cellular baseband processor 1424, and/or the transceiver(s) 1422 of the apparatus 1404 in FIG. 14.

In one example, the at least one second map layer is associated with a set of routes or locations for the predefined location, where the position of the UE is monitored using the at least one second map layer based on a nearest route or location in the set of routes or locations. In such an example, to switch to monitoring the position of the UE using the at least one second map layer, the UE may switch to the nearest route or location in the set of routes or locations based on the position of the UE.

In another example, the UE may switch to monitoring the position of the UE using the at least one second map layer based on at least one alternative positioning method, where the at least one alternative positioning method is different from the GNSS communication. In such an example, the at least one alternative positioning method includes: RF sensing, Wi-Fi positioning, Bluetooth positioning, network-based positioning, UWB positioning, a DR procedure, or a combination thereof.

At 1208, the UE may navigate the UE using the at least one second map layer based on the at least one alternative positioning method, such as described in connection with FIGS. 10 and 11. For example, as shown by FIG. 11, the UE 606 may navigate the UE 606 using the map of the parking garage 604 based on network-based positioning or indoor positioning. The navigation of the UE may be performed by, e.g., the navigation component 198, the cellular baseband processor 1424, and/or the transceiver(s) 1422 of the apparatus 1404 in FIG. 14.

In one example, the predefined location corresponds to a building including a plurality of floors, and the at least one second map layer includes a plurality of sub-layers corresponding to the plurality of floors in the building.

In another example, the at least one second map layer includes at least one feature associated with the predefined location.

In another example, the navigation of the UE is based on a PDR procedure.

In another example, the UE may identify a mobility mode associated with the UE, where the navigation of the UE is further based on the mobility mode.

At 1210, the UE may upload second information to a crowd sourcing server, where the second information is associated with the predefined location or associated with the detection that the position of the UE corresponds to the predefined location, such as described in connection with FIGS. 9 and 11. For example, as shown by FIG. 9, the UE 902 may upload features captured for a shopping mall 906 to a server 904, such that the features may be used by other UEs for identifying the shopping mall 906. The uploading of the information to a crowd sourcing server may be performed by, e.g., the navigation component 198, the cellular baseband processor 1424, and/or the transceiver(s) 1422 of the apparatus 1404 in FIG. 14.

At 1212, the UE may disable at least one navigation function associated with the map upon detecting that the position of the UE corresponds to the predefined location, such as described in connection with FIGS. 6 and 10. For example, as described in connection with FIG. 10, if the UE 606 has enabled the "snap-to-road" feature on the first map layer, the UE 606 may be configured to disable the "snap-to-road" feature for the first map layer after the UE 606 detects that it is in the parking garage 604. The disabling of the at least one navigation function may be performed by, e.g., the navigation component 198, the cellular baseband processor 1424, and/or the transceiver(s) 1422 of the apparatus 1404 in FIG. 14.

Figure 13:
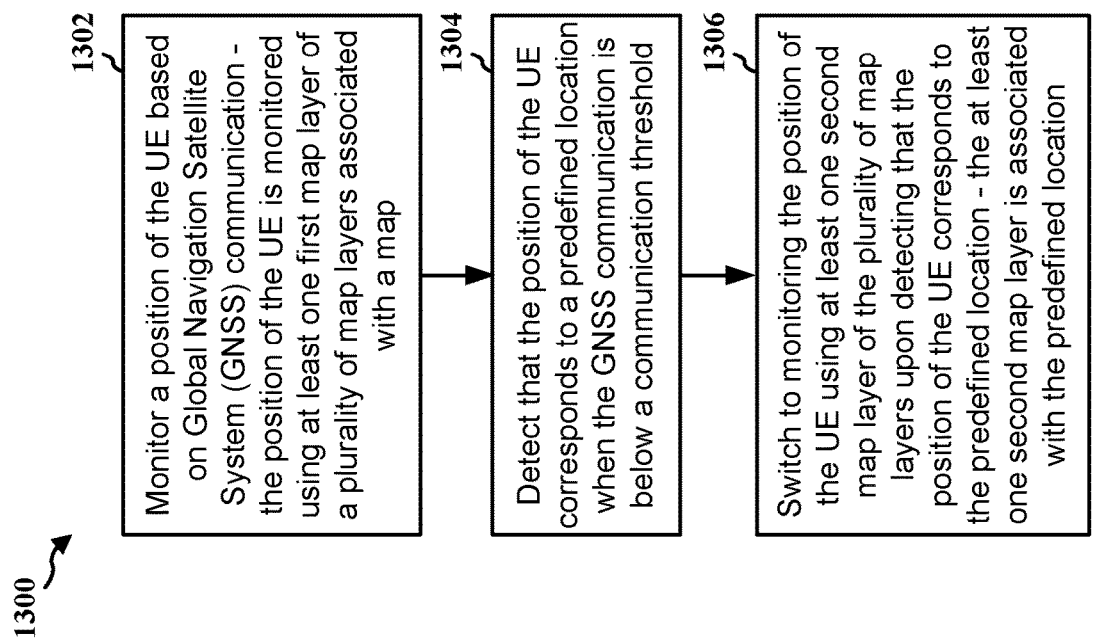
FIG. 13 is a flowchart of a method of wireless communication.

FIG. 13 is a flowchart 1300 of a method of wireless communication. The method may be performed by a UE (e.g., the UE 104, 404, 606, 902; the apparatus 1404). The method may enable the UE, which may be a navigation system or a device running a navigation/map application, to detect whether the UE is in a predefined location when the GNSS signals become unavailable, and the UE may switch the positioning of the UE using a different map layer that corresponds to the predefined location and/or navigate a user using at least one alternative positioning method that is not based on GNSS signals.

At 1302, the UE may monitor a position of the UE based on GNSS communication, where the position of the UE may be monitored using at least one first map layer of a plurality of map layers associated with a map, such as described in connection with FIGS. 6 and 10. For example, as shown by FIG. 10, the UE 606 may monitor the position of the automobile 602 (or the UE 606 itself) based on GNSS communication, where the position of the automobile 602 may be monitored using a first map layer as shown at 1004. The monitoring of the position of the UE based on GNSS communication may be performed by, e.g., the navigation component 198, the cellular baseband processor 1424, and/or the transceiver(s) 1422 of the apparatus 1404 in FIG. 14.

In one example, the map is associated with at least one of a navigation application or a map application.

At 1304, the UE may detect that the position of the UE corresponds to a predefined location when the GNSS communication is below a communication threshold, such as described in connection with FIGS. 6 to 11. For example, as shown by FIG. 6, the UE 606 may detect that the position of the automobile 602 corresponds to the parking garage 604 when the GNSS communication is unavailable or below a communication threshold. The detection of that the position of the UE corresponds to a predefined location when the GNSS communication is below a communication threshold may be performed by, e.g., the navigation component 198, the cellular baseband processor 1424, and/or the transceiver(s) 1422 of the apparatus 1404 in FIG. 14.

In one example, the GNSS communication being below the communication threshold corresponds to a level of detectability of the GNSS communication, and where the GNSS communication is undetectable below a certain level of the communication threshold.

In another example, the predefined location corresponds to an indoor location (e.g., a parking garage), and the UE may detect that the position of the UE corresponds to the parking garage based on detecting that: the UE travels over a defined number of speed bumps, the UE is stationary for a defined duration, a velocity of the UE is decreasing, the UE experiences a number of turns that exceeds a turn threshold, the UE is moving in a reverse direction, the UE is parked, a change in elevation of the UE, or a combination thereof.

In another example, to detect that the position of the UE corresponds to the predefined location, the UE may receive crowd-sourced information associated with the predefined location, and the UE may detect that the position of the UE corresponds to the predefined location based on the crowd-sourced information.

In another example, to detect that the position of the UE corresponds to the predefined location, the UE may obtain a set of images captured by at least one camera, and the UE may detect that the position of the UE corresponds to the predefined location based on the set of images captured by the at least one camera. In such an example, to obtain the set of images captured by the at least one camera, the UE may receive the set of images captured by the at least one camera, where the at least one camera is located at a source outside the UE, or the UE may capture the set of images with the at least one camera, where the at least one camera is located at the UE. In such an example, the set of images includes at least one image of: a front view of a vehicle, a rear view of the vehicle, one or more parking signs, one or more parked cars, one or more marks or symbols, or a combination thereof.

In another example, the detection that the position of the UE corresponds to the predefined location is based on a data collection procedure including at least one of ML or AI. In such an example, the data collection procedure is based on data captured from at least one sensor associated with the UE, and the detection that the position of the UE corresponds to the predefined location is further based on the data captured from the at least one sensor. In such an example, the data captured from the at least one sensor corresponds to: data associated with the GNSS communication, data from an IMU, data from a gyroscope, data from an odometer, data from a compass, data from a camera, data from a barometer, data associated with a steering wheel of a vehicle, or a combination thereof.

In another example, the UE may detect that the position of the UE corresponds to the predefined location based on a map matching procedure.

At 1306, the UE may switch to monitoring the position of the UE using at least one second map layer of the plurality of map layers upon detecting that the position of the UE corresponds to the predefined location, where the at least one second map layer may be associated with the predefined location, such as described in connection with FIGS. 10 and 11. For example, as shown by FIG. 10, the UE 606 may switch to monitoring the position of the automobile 602 using a second map layer upon detecting that the automobile 602 is in the parking garage 604, where the second map layer corresponds to the parking garage 604. The switching of the monitoring the position of the UE using at least one second map layer may be performed by, e.g., the navigation component 198, the cellular baseband processor 1424, and/or the transceiver(s) 1422 of the apparatus 1404 in FIG. 14.

In one example, the at least one second map layer is associated with a set of routes or locations for the predefined location, where the position of the UE is monitored using the at least one second map layer based on a nearest route or location in the set of routes or locations. In such an example, to switch to monitoring the position of the UE using the at least one second map layer, the UE may switch to the nearest route or location in the set of routes or locations based on the position of the UE.

In another example, the UE may switch to monitoring the position of the UE using the at least one second map layer based on at least one alternative positioning method, where the at least one alternative positioning method is different from the GNSS communication. In such an example, the at least one alternative positioning method includes: RF sensing, Wi-Fi positioning, Bluetooth positioning, network-based positioning, UWB positioning, a DR procedure, or a combination thereof.

In another example, the UE may navigate the UE using the at least one second map layer based on the at least one alternative positioning method, such as described in connection with FIGS. 10 and 11. For example, as shown by FIG. 11, the UE 606 may navigate the UE 606 using the map of the parking garage 604 based on network-based positioning or indoor positioning. The navigation of the UE may be performed by, e.g., the navigation component 198, the cellular baseband processor 1424, and/or the transceiver(s) 1422 of the apparatus 1404 in FIG. 14.

In another example, the predefined location corresponds to a building including a plurality of floors, and the at least one second map layer includes a plurality of sub-layers corresponding to the plurality of floors in the building.

In another example, the at least one second map layer includes at least one feature associated with the predefined location.

In another example, the navigation of the UE is based on a PDR procedure.

In another example, the UE may identify a mobility mode associated with the UE, where the navigation of the UE is further based on the mobility mode.

In another example, the UE may upload second information to a crowd sourcing server, where the second information is associated with the predefined location or associated with the detection that the position of the UE corresponds to the predefined location, such as described in connection with FIGS. 9 and 11. For example, as shown by FIG. 9, the UE 902 may upload features captured for a shopping mall 906 to a server 904, such that the features may be used by other UEs for identifying the shopping mall 906. The uploading of the information to a crowd sourcing server may be performed by, e.g., the navigation component 198, the cellular baseband processor 1424, and/or the transceiver(s) 1422 of the apparatus 1404 in FIG. 14.

In another example, the UE may disable at least one navigation function associated with the map upon detecting that the position of the UE corresponds to the predefined location, such as described in connection with FIGS. 6 and 10. For example, as described in connection with FIG. 10, if the UE 606 has enabled the "snap-to-road" feature on the first map layer, the UE 606 may be configured to disable the "snap-to-road" feature for the first map layer after the UE 606 detects that it is in the parking garage 604. The disabling of the at least one navigation function may be performed by, e.g., the navigation component 198, the cellular baseband processor 1424, and/or the transceiver(s) 1422 of the apparatus 1404 in FIG. 14.

Figure 14:
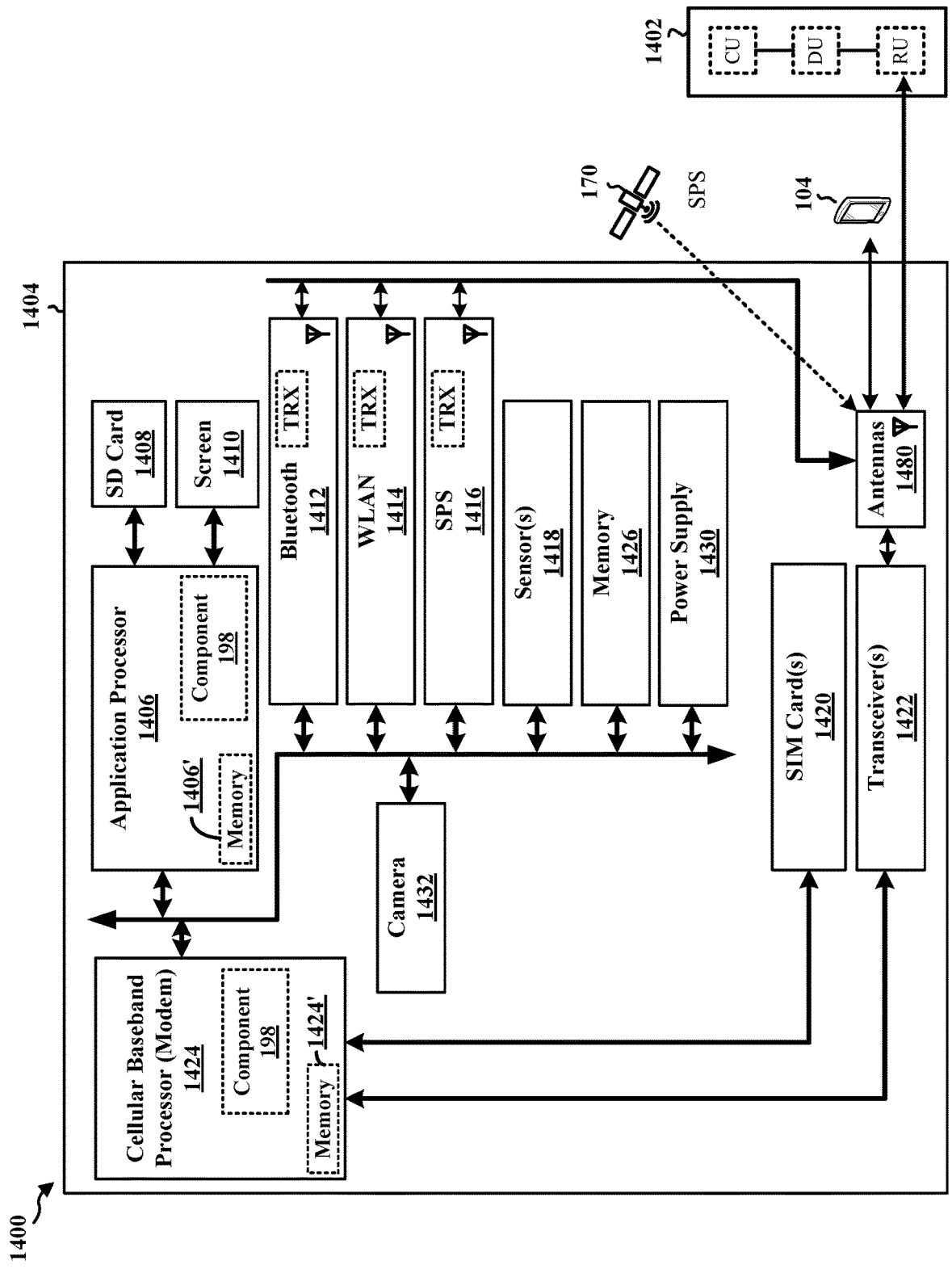
FIG. 14 is a diagram illustrating an example of a hardware implementation for an example apparatus and/or network entity.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include a cellular baseband processor 1424 (also referred to as a modem) coupled to one or more transceivers 1422 (e.g., cellular RF transceiver). The cellular baseband processor 1424 may include on-chip memory 1424'. In some aspects, the apparatus 1404 may further include one or more subscriber identity modules (SIM) cards 1420 and an application processor 1406 coupled to a secure digital (SD) card 1408 and a screen 1410. The application processor 1406 may include on-chip memory 1406'. In some aspects, the apparatus 1404 may further include a Bluetooth module 1412, a WLAN module 1414, an SPS module 1416 (e.g., GNSS module), one or more sensor modules 1418 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1426, a power supply 1430, and/or a camera 1432. The Bluetooth module 1412, the WLAN module 1414, and the SPS module 1416 may include an on-chip transceiver (TRX) (or in some cases, just a receiver (RX)). The Bluetooth module 1412, the WLAN module 1414, and the SPS module 1416 may include their own dedicated antennas and/or utilize the antennas 1480 for communication. The cellular baseband processor 1424 communicates through the transceiver(s) 1422 via one or more antennas 1480 with the UE 104 and/or with an RU associated with a network entity 1402. The cellular baseband processor 1424 and the application processor 1406 may each include a computer-readable medium/memory 1424', 1406', respectively. The additional memory modules 1426 may also be considered a computer-readable medium/memory. Each computer-readable medium/memory 1424', 1406', 1426 may be non-transitory. The cellular baseband processor 1424 and the application processor 1406 are each responsible for general processing, including the execution of software stored on the computer-readable medium/memory. The software, when executed by the cellular baseband processor 1424/application processor 1406, causes the cellular baseband processor 1424/application processor 1406 to perform the various functions described supra. The computer-readable medium/memory may also be used for storing data that is manipulated by the cellular baseband processor 1424/application processor 1406 when executing software. The cellular baseband processor 1424/application processor 1406 may be a component of the UE 350 and may include the memory 360 and/or at least one of the TX processor 368, the RX processor 356, and the controller/processor 359. In one configuration, the apparatus 1404 may be a processor chip (modem and/or application) and include just the cellular baseband processor 1424 and/or the application processor 1406, and in another configuration, the apparatus 1404 may be the entire UE (e.g., see 350 of FIG. 3) and include the additional modules of the apparatus 1404.

As discussed supra, the navigation component 198 may be configured to monitor a position of the UE based on GNSS communication, where the position of the UE is monitored using at least one first map layer of a plurality of map layers associated with a map. The navigation component 198 may also be configured to detect that the position of the UE corresponds to a predefined location when the GNSS communication is below a communication threshold. The navigation component 198 may also be configured to switch to monitoring the position of the UE using at least one second map layer of the plurality of map layers upon detecting that the position of the UE corresponds to the predefined location, where the at least one second map layer is associated with the predefined location. The navigation component 198 may be within the cellular baseband processor 1424, the application processor 1406, or both the cellular baseband processor 1424 and the application processor 1406. The navigation component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1404 may include a variety of components configured for various functions. In one configuration, the apparatus 1404, and in particular the cellular baseband processor 1424 and/or the application processor 1406, may include means for monitoring a position of the UE based on GNSS communication, where the position of the UE is monitored using at least one first map layer of a plurality of map layers associated with a map. The apparatus 1404 may further include means for detecting that the position of the UE corresponds to a predefined location when the GNSS communication is below a communication threshold. The apparatus 1404 may further include means for switching to monitoring the position of the UE using at least one second map layer of the plurality of map layers upon detecting that the position of the UE corresponds to the predefined location, where the at least one second map layer is associated with the predefined location.

In one configuration, the map is associated with at least one of a navigation application or a map application.

In another configuration, the GNSS communication being below the communication threshold corresponds to a level of detectability of the GNSS communication, and where the GNSS communication is undetectable below a certain level of the communication threshold.

In another configuration, the predefined location corresponds to an indoor location, and the UE may detect that the position of the UE corresponds to the parking garage based on detecting that: the UE travels over a defined number of speed bumps, the UE is stationary for a defined duration, a velocity of the UE is decreasing, the UE experiences a number of turns that exceeds a turn threshold, the UE is moving in a reverse direction, the UE is parked, a change in elevation of the UE, or a combination thereof.

In another configuration, the means for detecting that the position of the UE corresponds to the predefined location includes configuring apparatus 1404 to receive crowd-sourced information associated with the predefined location, and detect that the position of the UE corresponds to the predefined location based on the crowd-sourced information.

In another configuration, the means for detecting that the position of the UE corresponds to the predefined location includes configuring apparatus 1404 to obtain a set of images captured by at least one camera, and the UE may detect that the position of the UE corresponds to the predefined location based on the set of images captured by the at least one camera. In such a configuration, to obtain the set of images captured by the at least one camera, the apparatus 1404 may receive the set of images captured by the at least one camera, where the at least one camera is located at a source outside the UE, or apparatus 1404 may capture the set of images with the at least one camera, where the at least one camera is located at the UE. In such a configuration, the set of images includes at least one image of: a front view of a vehicle, a rear view of the vehicle, one or more parking signs, one or more parked cars, one or more marks or symbols, or a combination thereof.

In another configuration, the detection that the position of the UE corresponds to the predefined location is based on a data collection procedure including at least one of ML or AI. In such a configuration, the data collection procedure is based on data captured from at least one sensor associated with the UE, and the detection that the position of the UE corresponds to the predefined location is further based on the data captured from the at least one sensor. In such a configuration, the data captured from the at least one sensor corresponds to: data associated with the GNSS communication, data from an IMU, data from a gyroscope, data from an odometer, data from a compass, data from a camera, data from a barometer, data associated with a steering wheel of a vehicle, or a combination thereof.

In another configuration, the apparatus 1404 may further include means for detecting that the position of the UE corresponds to the predefined location based on a map matching procedure.

In another configuration, the at least one second map layer is associated with a set of routes or locations for the predefined location, where the position of the UE is monitored using the at least one second map layer based on a nearest route or location in the set of routes or locations. In such a configuration, the means for switching to monitoring the position of the UE using the at least one second map layer includes configuring the apparatus 1404 to switch to the nearest route or location in the set of routes or locations based on the position of the UE.

In another configuration, the apparatus 1404 may include means for switching to monitoring the position of the UE using the at least one second map layer based on at least one alternative positioning method, where the at least one alternative positioning method is different from the GNSS communication. In such a configuration, the at least one alternative positioning method includes: RF sensing, Wi-Fi positioning, Bluetooth positioning, network-based positioning, UWB positioning, a DR procedure, or a combination thereof.

In another configuration, the apparatus 1404 may further include means for navigating the UE using the at least one second map layer based on the at least one alternative positioning method.

In another configuration, the predefined location corresponds to a building including a plurality of floors, and the at least one second map layer includes a plurality of sublayers corresponding to the plurality of floors in the building.

In another configuration, the at least one second map layer includes at least one feature associated with the predefined location.

In another configuration, the navigation of the UE is based on a PDR procedure.

In another configuration, the apparatus 1404 may further include means for identifying a mobility mode associated with the UE, where the navigation of the UE is further based on the mobility mode.

In another configuration, the apparatus 1404 may further include means for uploading second information to a crowd sourcing server, where the second information is associated with the predefined location or associated with the detection that the position of the UE corresponds to the predefined location.

In another configuration, the apparatus 1404 may further include means for disabling at least one navigation function associated with the map upon detecting that the position of the UE corresponds to the predefined location.

The means may be the navigation component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including: monitoring a position of the UE based on GNSS communication, where the position of the UE is monitored using at least one first map layer of a plurality of map layers associated with a map; detecting that the position of the UE corresponds to a predefined location when the GNSS communication is below a communication threshold; and switching to monitoring the position of the UE using at least one second map layer of the plurality of map layers upon detecting that the position of the UE corresponds to the predefined location, where the at least one second map layer is associated with the predefined location.

Aspect 2 is the method of aspect 1, where the at least one second map layer is associated with a set of routes or locations for the predefined location, where the position of the UE is monitored using the at least one second map layer based on a nearest route or location in the set of routes or locations.

Aspect 3 is the method of aspect 2, where switching to monitoring the position of the UE using the at least one second map layer further includes switching to the nearest route or location in the set of routes or locations based on the position of the UE.

Aspect 4 is the method of any of aspects 1 to 3, where the GNSS communication being below the communication threshold corresponds to a level of detectability of the GNSS communication, and where the GNSS communication is undetectable below a certain level of the communication threshold.

Aspect 5 is the method of any of aspects 1 to 4, where the predefined location corresponds to an indoor location, the method further includes detecting that the position of the UE corresponds to the parking garage based on detecting that: the UE travels over a defined number of speed bumps, the UE is stationary for a defined duration, a velocity of the UE is decreasing, the UE experiences a number of turns that exceeds a turn threshold, the UE is moving in a reverse direction, the UE is parked, a change in elevation of the UE, or a combination thereof.

Aspect 6 is the method of any of aspects 1 to 5, where detecting that the position of the UE corresponds to the predefined location further includes: receiving crowd-sourced information associated with the predefined location; and detecting that the position of the UE corresponds to the predefined location based on the crowd-sourced information.

Aspect 7 is the method of any of aspects 1 to 6, where detecting that the position of the UE corresponds to the predefined location further includes: obtaining a set of images captured by at least one camera; and detecting that the position of the UE corresponds to the predefined location based on the set of images captured by the at least one camera.

Aspect 8 is the method of aspect 7, where obtaining the set of images captured by the at least one camera further includes: receiving the set of images captured by the at least one camera, where the at least one camera is located at a source outside the UE; or capturing the set of images with the at least one camera, where the at least one camera is located at the UE.

Aspect 9 is the method of aspect 7, where the set of images includes at least one image of: a front view of a vehicle, a rear view of the vehicle, one or more parking signs, one or more parked cars, one or more marks or symbols, or a combination thereof.

Aspect 10 is the method of any of aspects 1 to 9, where the detection that the position of the UE corresponds to the predefined location is based on a data collection procedure including at least one of ML or AI.

Aspect 11 is the method of aspect 10, where the data collection procedure is based on data captured from at least one sensor associated with the UE, and where the detection that the position of the UE corresponds to the predefined location is further based on the data captured from the at least one sensor.

Aspect 12 is the method of aspect 11, where the data captured from the at least one sensor corresponds to: data associated with the GNSS communication, data from an IMU, data from a gyroscope, data from an odometer, data from a compass, data from a camera, data from a barometer, data associated with a steering wheel of a vehicle, or a combination thereof.

Aspect 13 is the method of any of aspects 1 to 12, further including detecting that the position of the UE corresponds to the predefined location based on a map matching procedure.

Aspect 14 is the method of any of aspects 1 to 13, further including switching to monitoring the position of the UE using the at least one second map layer based on at least one alternative positioning method, where the at least one alternative positioning method is different from the GNSS communication.

Aspect 15 is the method of aspect 14, where the at least one alternative positioning method includes: RF sensing, Wi-Fi positioning, Bluetooth positioning, network-based positioning, UWB positioning, a DR procedure, or a combination thereof.

Aspect 16 is the method of aspect 14, further including navigating the UE using the at least one second map layer based on the at least one alternative positioning method.

Aspect 17 is the method of aspect 16, where the predefined location corresponds to a building including a plurality of floors, and the at least one second map layer includes a plurality of sub-layers corresponding to the plurality of floors in the building.

Aspect 18 is the method of aspect 16, where the at least one second map layer includes at least one feature associated with the predefined location.

Aspect 19 is the method of aspect 16, where the navigation of the UE is based on a PDR procedure.

Aspect 20 is the method of aspect 16, further including identifying a mobility mode associated with the UE, where the navigation of the UE is further based on the mobility mode.

Aspect 21 is the method of any of aspects 1 to 20, further including uploading second information to a crowd sourcing server, where the second information is associated with the predefined location or associated with the detection that the position of the UE corresponds to the predefined location.

Aspect 22 is the method of any of aspects 1 to 21, where the map is associated with at least one of a navigation application or a map application.

Aspect 23 is the method of any of aspects 1 to 22, further including disabling at least one navigation function associated with the map upon detecting that the position of the UE corresponds to the predefined location.

Aspect 24 is an apparatus for wireless communication at a wireless device, including: a memory; and at least one processor coupled to the memory and, based at least in part on information stored in the memory, the at least one processor is configured to implement any of aspects 1 to 23.

Aspect 25 is the apparatus of aspect 24, further including at least one of an antenna or a transceiver coupled to the at least one processor.

Aspect 26 is an apparatus for wireless communication including means for implementing any of aspects 1 to 23.

Aspect 27 is a computer-readable medium (e.g., a non-transitory computer-readable medium) storing computer executable code, where the code when executed by a processor causes the processor to implement any of aspects 1 to 23.

What is claimed is:

1. An apparatus for wireless communication at a user equipment (UE), comprising:
   a memory;
   a transceiver; and
   at least one processor coupled to the memory and the transceiver and, based at least in part on information stored in the memory, the at least one processor is configured to:
   monitor a position of the UE based on Global Navigation Satellite System (GNSS) communication, wherein the position of the UE is monitored using at least one first map layer of a plurality of map layers associated with a map;
   detect that the position of the UE corresponds to a predefined location when the GNSS communication is below a communication threshold; and
   switch to monitoring the position of the UE using at least one second map layer of the plurality of map layers upon detecting that the position of the UE corresponds to the predefined location, wherein the at least one second map layer is associated with the predefined location.

2. The apparatus of claim 1, wherein the at least one second map layer is associated with a set of routes or locations for the predefined location, wherein the position of the UE is monitored using the at least one second map layer based on a nearest route or location in the set of routes or locations.

3. The apparatus of claim 2, wherein to monitor the position of the UE using the at least one second map layer, the at least one processor is configured to:
   switch to the nearest route or location in the set of routes or locations based on the position of the UE.

4. The apparatus of claim 1, wherein the GNSS communication being below the communication threshold corresponds to a level of detectability of the GNSS communication, and wherein the GNSS communication is undetectable below a certain level of the communication threshold.

5. The apparatus of claim 1, wherein the at least one processor is further configured to detect that the position of the UE corresponds to an indoor location based on detecting that:
   the UE travels over a defined number of speed bumps,
   the UE is stationary for a defined duration,
   a velocity of the UE is decreasing,
   the UE experiences a number of turns that exceeds a turn threshold,
   the UE is moving in a reverse direction,
   the UE is parked,
   a change in elevation of the UE, or
   a combination thereof.

6. The apparatus of claim 1, wherein to detect that the position of the UE corresponds to the predefined location, the at least one processor is further configured to:
   receive crowd-sourced information associated with the predefined location; and
   detect that the position of the UE corresponds to the predefined location based on the crowd-sourced information.

7. The apparatus of claim 1, wherein to detect that the position of the UE corresponds to the predefined location, the at least one processor is configured to:
   obtain a set of images captured by at least one camera; and
   detect that the position of the UE corresponds to the predefined location based on the set of images captured by the at least one camera.

8. The apparatus of claim 7, wherein to obtain the set of images captured by the at least one camera, the at least one processor is configured to:
   receive the set of images captured by the at least one camera, wherein the at least one camera is located at a source outside the UE; or
   capture the set of images with the at least one camera, wherein the at least one camera is located at the UE.

9. The apparatus of claim 7, wherein the set of images includes at least one image of:
   a front view of a vehicle,
   a rear view of the vehicle,
   one or more parking signs,
   one or more parked cars,
   one or more marks or symbols, or
   a combination thereof.

10. The apparatus of claim 1, wherein the detection that the position of the UE corresponds to the predefined location is based on a data collection procedure including at least one of machine learning (ML) or artificial intelligence (AI).

11. The apparatus of claim 10, wherein the data collection procedure is based on data captured from at least one sensor associated with the UE, and wherein the detection that the position of the UE corresponds to the predefined location is further based on the data captured from the at least one sensor.

12. The apparatus of claim 11, wherein the data captured from the at least one sensor corresponds to:
   data associated with the GNSS communication,
   data from an inertial measurement unit (IMU),
   data from a gyroscope,
   data from an odometer,
   data from a compass,
   data from a camera,
   data from a barometer,
   data associated with a steering wheel of a vehicle, or
   a combination thereof.

13. The apparatus of claim 1, wherein the at least one processor is configured to detect that the position of the UE corresponds to the predefined location based on a map matching procedure.

14. The apparatus of claim 1, wherein the at least one processor is configured to switch to monitoring the position of the UE using the at least one second map layer based on at least one alternative positioning method, wherein the at least one alternative positioning method is different from the GNSS communication.

15. The apparatus of claim 14, wherein the at least one alternative positioning method comprises:
radio frequency (RF) sensing,
Wi-Fi positioning,
Bluetooth positioning,
network-based positioning,
ultra-wideband (UWB) positioning,
a dead reckoning (DR) procedure, or
a combination thereof.

16. The apparatus of claim 14, wherein the at least one processor is further configured to:
navigate the UE using the at least one second map layer based on the at least one alternative positioning method.

17. The apparatus of claim 16, wherein the predefined location corresponds to a building including a plurality of floors, and the at least one second map layer includes a plurality of sub-layers corresponding to the plurality of floors in the building.

18. The apparatus of claim 16, wherein the at least one second map layer includes at least one feature associated with the predefined location.

19. The apparatus of claim 16, wherein the navigation of the UE is based on a pedestrian dead reckoning (PDR) procedure.

20. The apparatus of claim 16, wherein the at least one processor is further configured to:
identify a mobility mode associated with the UE, wherein the navigation of the UE is further based on the mobility mode.

21. The apparatus of claim 1, wherein the at least one processor is further configured to:
upload second information to a crowd sourcing server, wherein the second information is associated with the predefined location or associated with the detection that the position of the UE corresponds to the predefined location.

22. The apparatus of claim 1, wherein the map is associated with at least one of a navigation application or a map application.

23. The apparatus of claim 1, wherein the at least one processor is further configured to:
disable at least one navigation function associated with the map upon detecting that the position of the UE corresponds to the predefined location.

24. A method of wireless communication at a user equipment (UE), comprising:
monitoring a position of the UE based on Global Navigation Satellite System (GNSS) communication, wherein the position of the UE is monitored using at least one first map layer of a plurality of map layers associated with a map;
detecting that the position of the UE corresponds to a predefined location when the GNSS communication is below a communication threshold; and
switching to monitoring the position of the UE using at least one second map layer of the plurality of map layers upon detecting that the position of the UE corresponds to the predefined location, wherein the at least one second map layer is associated with the predefined location.

25. The method of claim 24, wherein the detecting that the position of the UE corresponds to the predefined location further comprises:
receiving crowd-sourced information associated with the predefined location; and
detecting that the position of the UE corresponds to the predefined location based on the crowd-sourced information.

26. The method of claim 24, wherein the detecting that the position of the UE corresponds to the predefined location further comprises:
obtaining a set of images captured by at least one camera; and
detecting that the position of the UE corresponds to the predefined location based on the set of images captured by the at least one camera.

27. The method of claim 24, further comprising:
uploading second information to a crowd sourcing server, wherein the second information is associated with the predefined location or associated with the detection that the position of the UE corresponds to the predefined location.

28. The method of claim 24, further comprising:
disabling at least one navigation function associated with the map upon detecting that the position of the UE corresponds to the predefined location.

29. An apparatus for wireless communication at a user equipment (UE), comprising:
means for monitoring a position of the UE based on Global Navigation Satellite System (GNSS) communication, wherein the position of the UE is monitored using at least one first map layer of a plurality of map layers associated with a map;
means for detecting that the position of the UE corresponds to a predefined location when the GNSS communication is below a communication threshold; and
means for switching to monitoring the position of the UE using at least one second map layer of the plurality of map layers upon detecting that the position of the UE corresponds to the predefined location, wherein the at least one second map layer is associated with the predefined location.

30. A computer-readable medium storing computer executable code at a user equipment (UE), the code when executed by a processor causes the processor to:
monitor a position of the UE based on Global Navigation Satellite System (GNSS) communication, wherein the position of the UE is monitored using at least one first map layer of a plurality of map layers associated with a map;
detect that the position of the UE corresponds to a predefined location when the GNSS communication is below a communication threshold; and
switch to monitoring the position of the UE using at least one second map layer of the plurality of map layers upon detecting that the position of the UE corresponds to the predefined location, wherein the at least one second map layer is associated with the predefined location.

* * * * *